United States Patent
Lehman et al.

(10) Patent No.: US 11,146,459 B2
(45) Date of Patent: Oct. 12, 2021

(54) SYSTEM AND METHOD FOR FACILITATING INSTALLATION AND CONFIGURATION OF NETWORK DEVICES

(71) Applicant: Starry, Inc., Boston, MA (US)

(72) Inventors: Donald Lehman, Brooklyn, NY (US); Colin Reisterer, Boston, MA (US); Noah Greene, Boston, MA (US)

(73) Assignee: Starry, Inc., Boston, MA (US)

( * ) Notice: Subject to any disclaimer, the term of this patent is extended or adjusted under 35 U.S.C. 154(b) by 43 days.

(21) Appl. No.: 16/376,189

(22) Filed: Apr. 5, 2019

(65) Prior Publication Data

US 2019/0312774 A1  Oct. 10, 2019

Related U.S. Application Data

(60) Provisional application No. 62/653,072, filed on Apr. 5, 2018.

(51) Int. Cl.
*H04L 12/24* (2006.01)
*G06K 9/46* (2006.01)
(Continued)

(52) U.S. Cl.
CPC ............ *H04L 41/22* (2013.01); *G06K 9/46* (2013.01); *G06K 9/78* (2013.01); *H04L 41/0806* (2013.01);
(Continued)

(58) Field of Classification Search
CPC . H04L 41/0809; H04L 41/22; H04L 41/0889; H04L 41/0883; H04L 41/145;
(Continued)

(56) References Cited

U.S. PATENT DOCUMENTS

2010/0150027 A1   6/2010   Atwal et al.
2011/0150292 A1*  6/2011   Boncyk ............... G06F 16/9537
                                              382/116
(Continued)

FOREIGN PATENT DOCUMENTS

EP   2 466 968    6/2012
EP   2 784 681    1/2014
(Continued)

OTHER PUBLICATIONS

Partial International Search Report, dated Jul. 8, 2019, from International Application No. PCT/US2019/025965, filed on Apr. 5, 2019. 9 pages.
(Continued)

*Primary Examiner* — Kwang B Yao
*Assistant Examiner* — Syed M Bokhari
(74) *Attorney, Agent, or Firm* — HoustonHogle LLP

(57) ABSTRACT

A mobile application for facilitating configuration and installation of networking and extender devices in a local area network utilizes augmented reality to provide configuration guidance information and network information. For configuring the networking device, a camera of the mobile computing device captures an image depicting the networking device, which is displayed on a touchscreen display of the mobile computing device with graphical elements including icons and textual information overlaid on the image to indicate configuration guidance information. Similarly, for installing the extender device, the camera captures image data depicting areas of the premises where the device is being installed and graphical elements are overlaid on the image data indicating network information such as the position of a previously installed networking device as well as the signal strength of wireless signals from the networking device.

16 Claims, 28 Drawing Sheets

(51) Int. Cl.
  *G06K 9/78* (2006.01)
  *H04W 16/18* (2009.01)
  *H04W 16/26* (2009.01)
(52) U.S. Cl.
  CPC ...... *H04L 41/0809* (2013.01); *H04L 41/0883* (2013.01); *H04L 41/0889* (2013.01); *H04L 41/145* (2013.01); *H04L 41/20* (2013.01); *H04W 16/18* (2013.01); *H04W 16/26* (2013.01)
(58) Field of Classification Search
  CPC ....... H04L 41/20; H04L 41/0806; G06K 9/46; G06K 9/78; H04W 16/18; H04W 16/26
  USPC .......................................................... 370/254
  See application file for complete search history.

(56) References Cited

U.S. PATENT DOCUMENTS

| | | | | |
|---|---|---|---|---|
| 2012/0147040 A1* | 6/2012 | Yun | ................ | G06T 19/006 345/633 |
| 2014/0089810 A1* | 3/2014 | Chen | ................ | G06F 1/1686 715/738 |
| 2015/0038129 A1* | 2/2015 | Sundareswaran | ..... | H04L 63/083 455/418 |
| 2018/0054487 A1 | 2/2018 | Hebsur et al. | | |
| 2018/0077200 A1* | 3/2018 | Apvrille | ............ | H04L 63/1416 |
| 2019/0087078 A1* | 3/2019 | Norton | ................ | G08B 29/145 |
| 2019/0281473 A1* | 9/2019 | Liao | ................ | H04B 7/0639 |

FOREIGN PATENT DOCUMENTS

| | | |
|---|---|---|
| EP | 3 070 625 | 9/2016 |
| WO | WO 2015101393 | 7/2015 |
| WO | WO 2017106046 | 6/2017 |

OTHER PUBLICATIONS

International Preliminary Report on Patentability, dated Oct. 15, 2020, from International Application No. PCT/US2019/025965, filed on Apr. 5, 2019. 11 pages.

International Search Report, dated Sep. 24, 2019, from International Application No. PCT/US2019/025965, filed on Apr. 5, 2019. 18 pages.

* cited by examiner

SYSTEM AND METHOD FOR FACILITATING INSTALLATION AND CONFIGURATION OF NETWORK DEVICES

RELATED APPLICATIONS

This application claims the benefit under 35 USC 119(e) of U.S. Provisional Application No. 62/653,072, filed on Apr. 5, 2018, which is incorporated herein by reference in its entirety.

BACKGROUND OF THE INVENTION

Consumer or small business grade networking devices are commonly installed on user premises to support local area networks (LAN). Often, these networking devices are commodity devices that are provided by an internet service provider (ISP) as part of an internet subscription service. In other cases, consumers directly purchase devices to serve as routers and wireless access points. Typically, these devices perform router functions such as forwarding data packets between computer networks such as the LAN for the premises and the service provider networks, which provides access to the internet. Often, these networking devices include Wi-Fi capability, which is wireless local area networking (LAN) based on the IEEE (Institute of Electrical and Electronics Engineers) 802.11 standards. They also maintain the local network and perform functions such as Dynamic Host Configuration Protocol (DHCP) services, domain name system (DNS) services, point-to-point protocol over Ethernet (PPPoE) services, network address translation NAT) services, provide encryption such as WPA2, and a firewall, among other things.

Networking devices that include Wi-Fi capability maintain a wireless local area network (WLAN) by linking computing devices using wireless communication with each other and/or with the internet. The networking devices communicate with the computing devices by broadcasting and receiving wireless signals, such as radiofrequency (RF) signals, to and from the computing devices in the vicinity of the networking device. The wireless signals are typically in either a 2.4 GHz frequency range or a 5 GHz frequency range, and simultaneous operation in both ranges is a common feature of these networking devices.

The strength of wireless signals refers to the power present in wireless signals received by a device. In general, the strength of wireless signals decreases as the distance between two communicating devices increases. However, there are other factors affecting signal strength. Features of the premises such as the layout and/or composition of walls situated between the two devices, or the presence of metal appliances in the vicinity of either device, can decrease the signal strength. Additionally, wireless signals in the 5 GHz frequency range are less able to penetrate solid objects than those in the 2.4 GHz range. All of these considerations result in networking devices effectively having a coverage area, or a set of areas of the premises for which wireless communication with the networking device is possible. The coverage area of even identical networking devices can vary based on the different premises in which the devices operate and even the installation location within the same premises.

Extender devices have been developed to maximize the coverage area for WLANs managed by networking devices by providing a link between the networking devices and computing devices that may be located outside or at the periphery of the coverage areas of the networking devices. In general, an extender device is installed within the coverage area of a networking device and re-broadcasts wireless signals to and from the networking device.

At the same time, mobile computing devices such as smartphones or tablets have become somewhat ubiquitous in both consumer and business settings. These devices are typically equipped with cameras for capturing still images and/or video image data and sensors like accelerometers, magnetometers, and gyroscopes. Among other functions, operating systems (OS) as well as different mobile applications executing on the mobile computing devices render graphical user interfaces (GUI) on touchscreen displays of the devices. The GUIs can include graphical elements such as icons, virtual buttons, menus, textual information and images. Users of the mobile computing devices interact with the GUIs by, for example, touching regions of the display containing the graphical elements.

The field of computer vision includes various methods for processing still images and/or video image data to extract meaningful information. These involve object recognition for categorizing or identifying objects based on previously learned objects, motion tracking, and feature detection, for identifying edges, corners, ridges and other regions of interest in the image data. In many cases, sensor data such as that generated by the sensors of a mobile computing device, can be used to further process the image data. Computer vision methods can be used to recognize objects, resolve the orientation (for example, of the mobile computing device capturing the image data), and recognize features such as floors, walls, and other surfaces visible in the image data.

Augmented reality is an emerging technology that utilizes computer vision methods to augment real-time image data with additional perceptual information. For example, in many of these systems, text and graphical elements such as icons are overlaid on real-time image data of a surrounding environment in order to provide information about the surroundings as well as provide an interface for interaction between the systems and their users. Commonly, augmented reality experiences are provided via touchscreen displays of mobile computing devices, which, for example, can be placed in the user's field of vision to simultaneously capture image data from the user's field of vision via a camera, as well as display the image data along with overlaid information.

SUMMARY OF THE INVENTION

Networking devices and extender devices are typically installed by users themselves, for example, in their homes. Nonetheless, the process can present challenges to many users. For example, users that lack basic knowledge of networking technology might find configuring a new networking device difficult. In another example, users installing extender devices may be inclined to install the extender device in a location where they have a weak signal, which would result in a weak connection between the extender device and the networking device, defeating the purpose of the extender device. These challenges are often hard to troubleshoot and resolve over the phone, but sending technicians is costly. A system would be desirable that can facilitate installation and configuration of these devices by providing information and assistance without requiring the participation of a technician, either in person or over the phone. In general, the present invention utilizes augmented reality to overlay this information and assistance on captured image data from the individual users' surroundings.

In one example, a mobile application executing on a mobile computing device takes a captured image depicting the networking device, detects features of the networking device such as its display and/or physical interface, and overlays a virtual diagram on top of the image of the user's networking device, showing the user where different cables should be inserted.

In another example, the mobile application guides users to the exact spots in their homes for ideal signal propagation by taking captured image data depicting the potential areas where the extender device would be installed (for example, different rooms of a home), detecting features of the areas, and overlaying information about the network on the image data. This network information can include the position of the networking device to which the extender will connect as well as virtual signal rings drawn on the floors representing the signal strength in the depicted locations. In this example, blue rings indicate that the signal strength at the specified location is good enough for installing the extender device, while red rings indicate that the signal strength is not good enough for installing the extender device. Additional information, such as the pairing status of the networking device and the extender device, is also displayed.

In general, according to one aspect, the invention features a method for facilitating configuration of a networking device using a mobile computing device. Image data depicting the networking device is captured and processed to recognize features of the depicted networking device. Guidance for facilitating configuration of the networking device is then displayed based on the recognized features of the networking device.

In embodiments, the image data is processed by comparing the captured image data against reference images and/or models of the networking device, and the image is processed in order to recognize specifically a physical interface of the networking device.

Graphical elements indicating configuration guidance information are displayed in different positions with respect to the recognized features of the networking device. In one example (e.g. using a smart phone), the captured image data are rendered on a display of the mobile computing device with the graphical elements overlaid on the image data in different positions with respect to regions of the image data corresponding to the recognized features of the networking device. In another example (e.g. using augmented reality glasses), the graphical elements are superimposed into a field of view of a user in different positions with respect to visible features of the networking device in the field of view of the user based on the captured image data and the recognized features of the networking device. These graphical elements can be displayed in animation, and can represent cables to be plugged into an interface of the networking device, an electrical socket of a premises where the networking device is being installed, and/or ports for other devices. Additionally, a configuration status of the networking device is determined.

In general, according to another aspect, the invention features a method for facilitating installation of an extender device in a wireless network of a premises using a mobile computing device. Image data depicting areas of the premises is captured and processed to recognize features of the depicted areas. Network information is then displayed based on the recognized features of the areas of the premises.

In embodiments, the network information includes signal strength information for the wireless network, configuration status information for the extender device and/or position information for previously installed devices of the wireless network, the position information being generated based on previously installed devices recognized in the image data.

Graphical elements indicating the network information are displayed in different positions with respect to the recognized features of the areas of the premises. In one example (e.g. using a smart phone), the captured image data is rendered on a display of the mobile computing device with the graphical elements overlaid on the image data in different positions with respect to regions of the image data corresponding to the recognized features of the depicted areas of the premises. In another example (e.g. using augmented reality glasses), the graphical elements are superimposed into a field of view of a user in different positions with respect to visible features of the areas of the premises in the field of view of the user based on the captured image data and the recognized features. The different positions of the graphical elements are determined based on geometric information for the mobile computing device and the depicted areas of the premises, and recognized features of the premises. Visual characteristics of the graphical elements are also based on the network information.

In general, according to another aspect, the invention features a system for facilitating configuration of a networking device. The system comprises a mobile computing device comprising a camera for capturing image data depicting the networking device. A mobile application executing on a processor of the mobile computing device recognizes features of the depicted networking device based on the captured image data, and a display presents guidance for facilitating configuration of the networking device based on the recognized features of the networking device.

In general, according to another aspect, the invention features a system for facilitating installation of an extender device in a wireless network of a premises. The system comprises a mobile computing device, which comprises a camera for capturing image data depicting areas of the premises. A mobile application executing on a processor of the mobile computing device recognizes features of the depicted areas of the premises based on the captured image data, and a display presents network information based on the recognized features.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be in an idealized or overly formal sense unless expressly so defined herein.

Figure 1A:
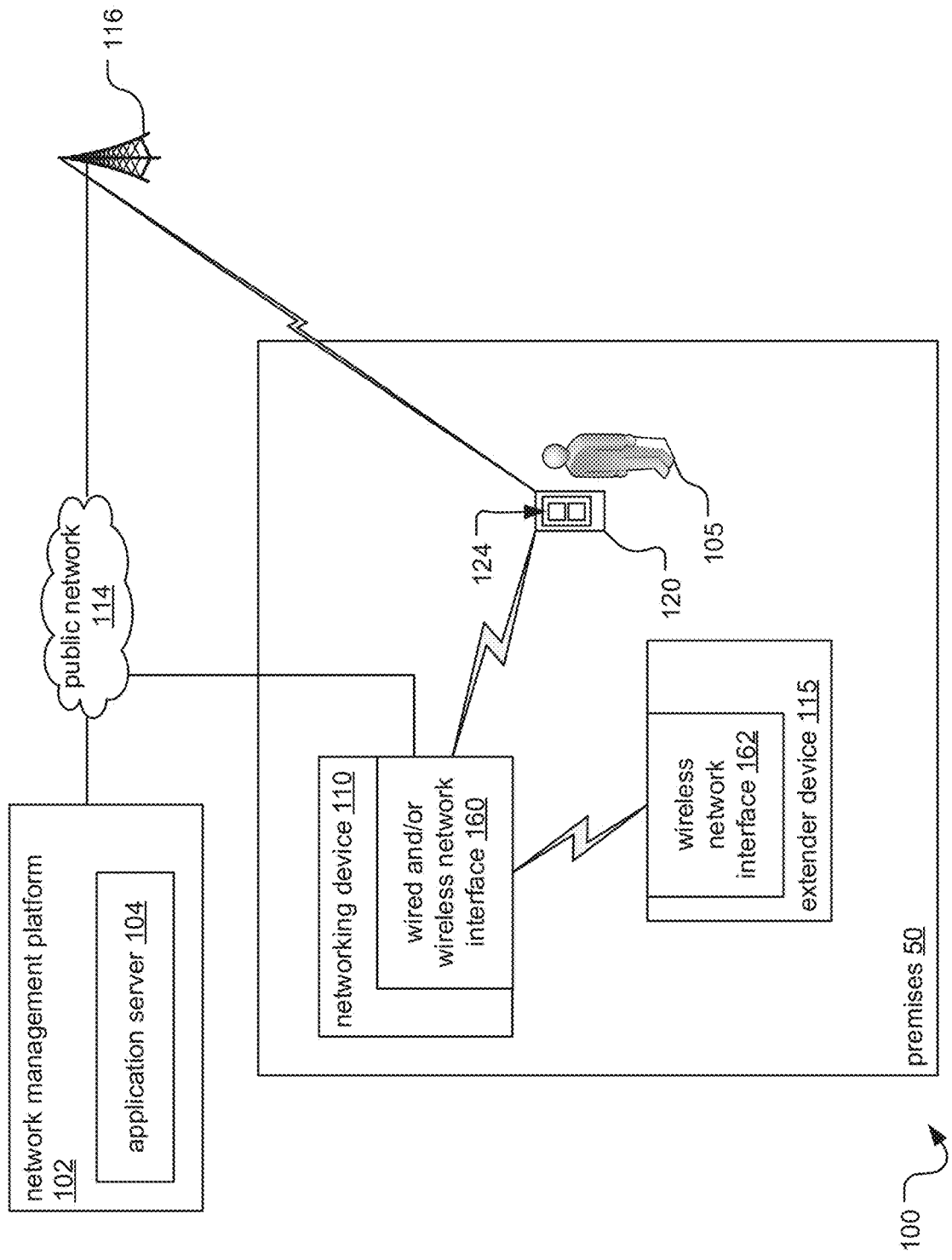
FIG. 1A is a schematic diagram illustrating an exemplary local area network (LAN) to which the present invention is applicable.

FIG. 1A is a diagram illustrating an exemplary local area network (LAN) 100 to which the present invention is applicable. In general, the current invention includes a system and method for facilitating the installation and/or configuration of networking devices 110 and/or extender devices 115 in the LAN 100.

The LAN 100 includes a networking device 110, which is to be installed or has been previously installed at a premises 50 such as a home or office. The LAN 100 also includes an extender device 115 to be installed.

The networking device 110, which is an access point or router, supports network connections for host computing devices and maintains the LAN 100 for the premises 50. In one embodiment, the device performs the traditional functions associated with networking devices such as routers. These include Dynamic Host Configuration Protocol (DHCP) services, domain name system (DNS) services, point-to-point protocol over Ethernet (PPPoE) services, network address translation (NAT) services, encryption such as WPA2, and firewall, among other things.

The networking device 110 includes a wired and/or wireless network interface 160. The wireless and/or wired network interface 160 connects to an internet service provider wireless, cable or optical fiber modem or gateway and to host devices to provide connectivity between the host devices and to the internet. In one example, the interface includes a Wi-Fi antenna and a Wi-Fi interface implemented in accordance with any of the wireless local area network (WLAN) standards IEEE 802.11 ac/n/g/b/a, in both the 2.4 GHz and 5.0 GHz frequency bands. In another example, the interface also includes a wired data interface including one or more gigabit Ethernet ports and/or RJ-45 jacks.

The extender device 115 provides a link between host devices and the networking device 110 by re-broadcasting wireless signals to and from the networking device 110 and the host devices. Ideally, the extender device 115 is installed in a location within the premises 50 where the signal strength allows reliable communication between the extender device 115 and the networking device 110.

The extender device includes a wireless network interface 162, which connects to the networking device 110 and to host devices to provide connectivity between the host devices and the networking device 110. Similar to the wired and/or wireless interface 160 of the networking device 110 as previously described, the wireless network interface 162 of the extender device includes a Wi-Fi antenna and a Wi-Fi interface.

At the premises 50, a user 105 operates a mobile computing device 120. The user 105 is the individual installing and/or configuring the networking device 110 and the extender device 115 and, in examples, is a user or a technician.

In the illustrated example, the mobile computing device 120 is a smartphone device. Alternatively, the mobile computing device 120 could be a laptop computer, tablet computer, phablet computer (i.e., a mobile device that is typically larger than a smart phone, but smaller than a tablet), smart glasses, or augmented reality (AR) glasses, to list a few examples.

A mobile application 124 executing on the mobile computing device 120 facilitates the installation and/or configuration of the networking device 110 and the extender device 115 at the premises 50, in general, using data available to the mobile application 124 locally (such as sensor data) and/or remotely.

The mobile application 124 communicates via a public network 114 (such as the Internet) with a network management platform 102. The network management platform 102, which includes an application server 104, maintains network information for the LAN 100 as well as device information for the networking device 110 and the extender device 115 including reference images and/or models of the devices. This information is stored, for example, in a database, and sent to the mobile application 124 by the application server 104.

Figure 1B:
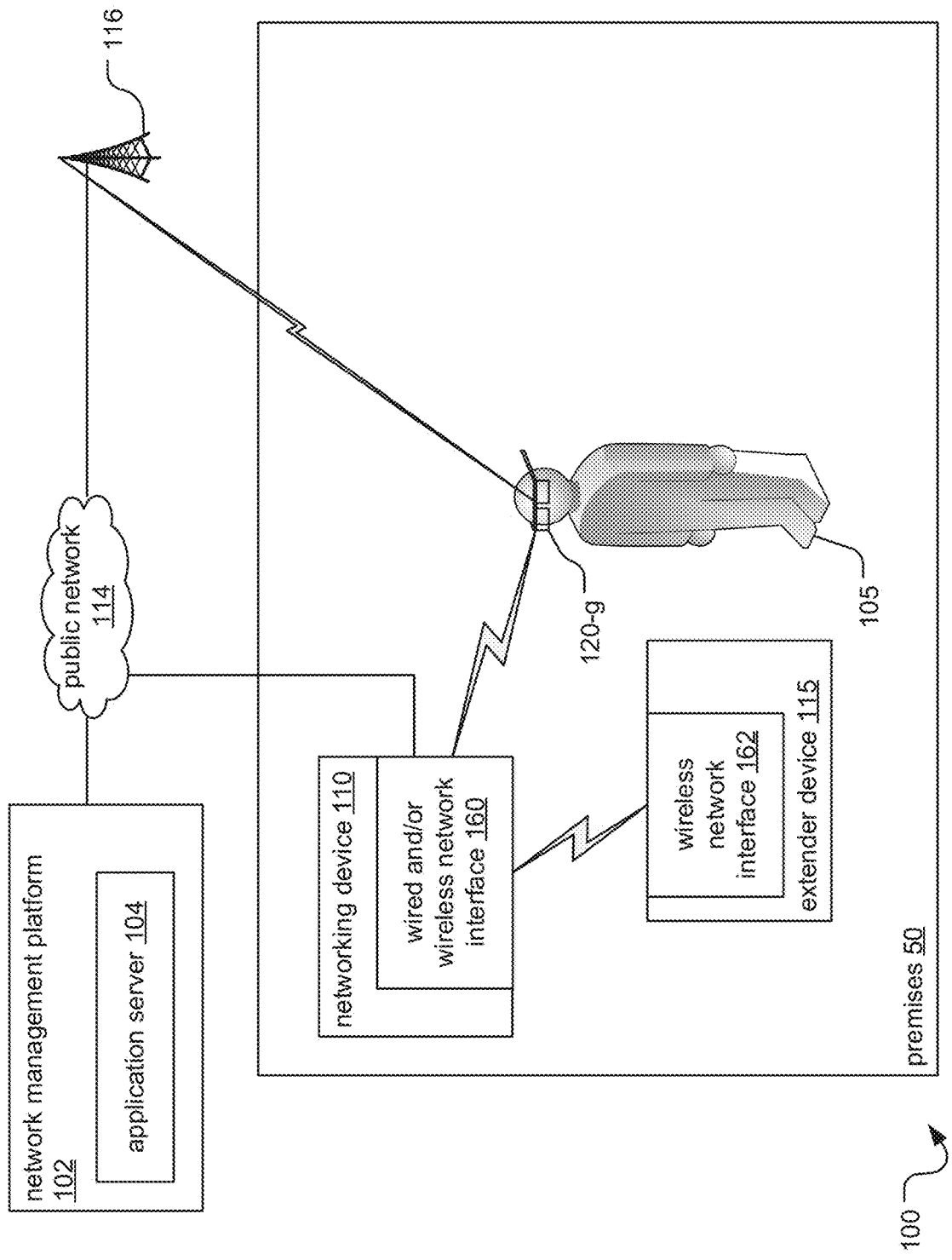
FIG. 1B is a schematic diagram of the LAN according to an embodiment of the invention including augmented reality (AR) glasses worn by a user.

FIG. 1B is a diagram of the LAN 100 according to another embodiment of the invention. The system is similar to that described with respect to FIG. 1A. Now, however, the mobile computing device 120 is specifically a set of smart glasses 120-g worn by the user 105.

In one embodiment, the smart glasses 120-g include transparent lenses through which the user 105 views the surrounding environment, and the smart glasses 120-g superimpose information onto the field of view of the user 105 using augmented reality (AR) technology. Commercial examples of the smart glasses 120-g include the HoloLens® mixed reality smart glasses, offered by Microsoft, and the Magic Leap One® head-mounted virtual retinal display device, offered by Magic Leap, among other examples.

In the illustrated embodiment, the smart glasses 120-g wirelessly connects to the LAN 100 and/or the public network 114 and executes the mobile application 124 for facilitating the installation and/or configuration of the networking device 110 and the extender device 115.

In another embodiment, the smart glasses 120-g are a virtual reality headset.

Figure 1C:
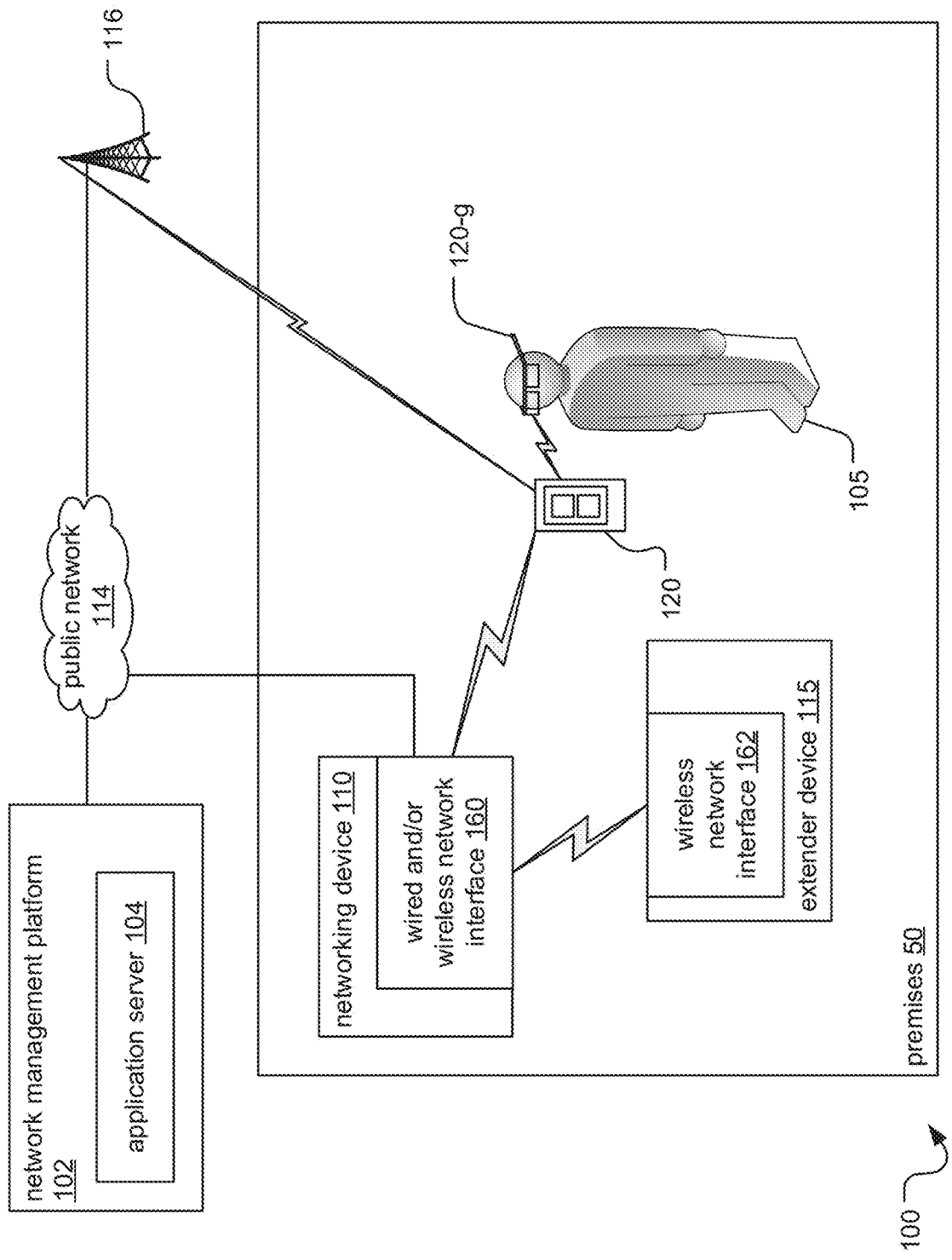
FIG. 1C is a schematic diagram of the LAN according to another embodiment in which the AR glasses operate in conjunction with a separate mobile computing device.

FIG. 1C is a diagram of the LAN 100 according to yet another embodiment of the invention. The system is similar to that described with respect to FIG. 1B. Now, however, the smart glasses 120-g wirelessly communicates with the smartphone mobile computing device 120 through a wired or wireless communication link such as a Bluetooth link. In this embodiment, the smartphone executes the mobile application 124 and connects to the LAN 100 and public network 114, while the smart glasses 120-g receive and display data fed to it by the smartphone.

Figure 2:
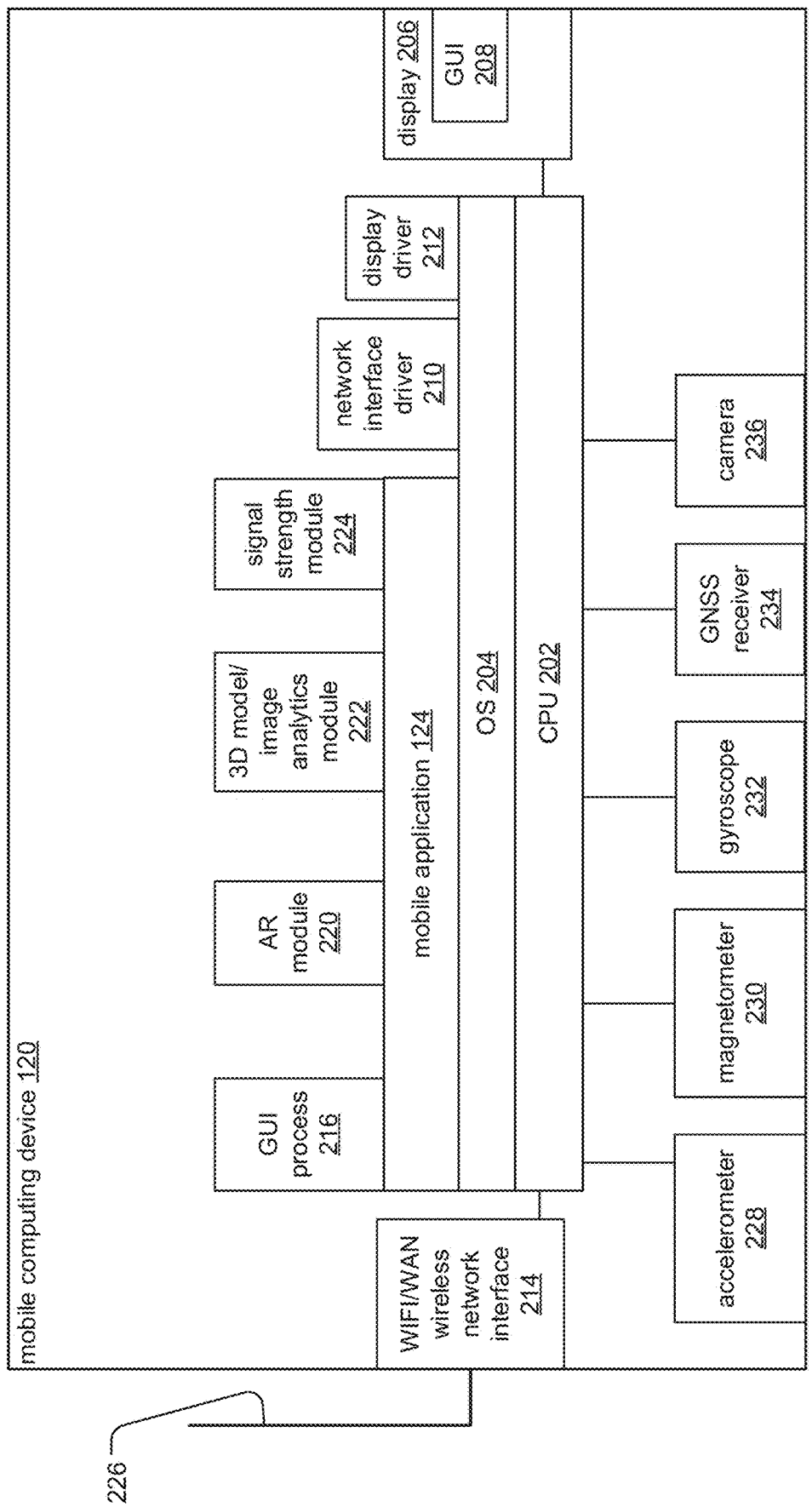
FIG. 2 is a schematic diagram of a mobile computing device.

FIG. 2 is a schematic diagram of the mobile computing device 120, which can be the smart phone or the smart glasses 120-g. The device includes a CPU 202, one or more displays 206, an accelerometer 228, a magnetometer 230, a gyroscope 232, a global navigation satellite system (GNSS) receiver 216, a camera 236, a Wifi/WAN wireless network interface 214, and one or more antennas 226.

The CPU 202 executes firmware/operating system instructions and sends instructions and data to and receives data from the wireless network interface 214, the different sensors 228, 230, 232, the GNSS receiver 234, the camera 236, and the display 206. Executing on typically an operating system 204 of the CPU 202 are a mobile application 124, a network interface driver 210, which directs the functionality of the WiFi/WAN wireless network interface 214, and a display driver 212, which directs the functionality of the display 206, which, in examples, is a touchscreen display of a smart phone and/or a heads-up display of smart glasses 120-g, among other examples.

In general, the sensors 228, 230, 232, 234 detect movement of the mobile computing device 120 and generate sensor data. More specifically, the accelerometer measures the acceleration of the mobile computing device 120, the magnetometer 230 measures the rotation and orientation of the mobile computing device 120 with respect to an ambient magnetic field, and the gyroscope 232 measures the angular velocity of the mobile computing device 120.

The GNSS receiver 234 receives positioning signals from GNSS satellites (such as GPS satellites) and sends positioning signals to the CPU 202, which uses them to generate location information, which is information about the current location of the mobile computing device 120.

The camera 236 captures images of the networking device 110 and/or an area of the premises 50 (within the camera's 236 field of view) and generates image data depicting the networking device 110 or area.

in general, the wireless network interface 214 sends and receives information between the mobile computing device 120 and the application server 104 via the antenna 226 through a wireless communication link to the WAN/LAN access point 116.

The mobile application 124 includes a graphical user interface (GUI) process 216, an augmented reality (AR) module 220, a 3D model/image analytics module 222, and a signal strength module 224. In general, the mobile application 124 presents via the display 206 recognizes the networking device 110 and the extender device 115, features of the devices, and/or features of areas of the premises 50 depicted in image data captured by the camera 236.

In general, the GUI process 216 renders a GUI 208 on the display 206. The GUI 208 includes a series of screens or views for displaying information and/or receiving input from the user 105, for example, by detecting contact between the user 105 and the touchscreen display 206 in certain regions of the touchscreen display 206. The GUI process 216 generates graphical elements (such as icons, virtual buttons, menus, textual information) to be displayed via the GUI 208 and/or receives user input indicating selections of options represented by the graphical elements of the GUI 208.

More specifically, the GUI process 216 receives captured image data depicting the networking device 110 and/or the area of the premises 50. The GUI process 216 also receives icon position information indicating positions for graphical elements to be displayed with respect to recognized features of the networking device 110 and/or the area of the premises 50. In one example, the GUI process 216 displays the captured image data itself (e.g. by rendering the image data on a touchscreen display 206 of a smart phone) along with graphical elements overlaid on the captured image data in different positions with respect to regions of the image data corresponding to the recognized features of the networking device 110 and/or area of the premises 50, based on the icon position information. In another example (e.g. using the smart glasses 120-g), the GUI process 216 superimposes the graphical elements into the field of view of the user 105 in different positions with respect to visible features of the networking device 110 and/or area of the premises 50, based on the captured image data and the recognized features.

In general, the 3D model/image analytics module 222 receives image data generated by the camera 236 and generates position information for objects and/or features recognized in the image data. The position information associates different recognized objects with positions (such as coordinates) with respect to the image data. The objects and/or features can be recognized according to object recognition methods or other methods associated with machine vision, including, for example, comparing the image data to reference images and/or models of different objects. In different examples, the 3D model/image analytics module 222 recognizes in the image data the networking device 110 (including, for example, specific features of a physical interface of the device including data and/or power ports), the extender device 115, ground planes, floors, walls, and windows, among other examples.

The signal strength module 224 detects wireless signals from the networking device 110 via the WiFi/WAN wireless network interface 214 and generates signal strength information.

The AR module 220 generates icon position information for graphical elements to be displayed on the GUI 208. The icon position information represents visual characteristics and/or positions of the graphical elements with respect to the image data itself or with respect to the field of view of the user 105. The graphical elements represent recognized objects and/or indicate information such as configuration guidance information and/or network information such as signal strength information. The icon position information is generated based on the object position information generated by the 3D model/image analytics module 222, the signal strength information generated by the signal strength module 224, and other information such as status information for the LAN 100 and/or instructional information, both of which can be provided by the application server 104. Additionally, the icon position information is generated based on geometric information for the mobile computing device 120 and the surrounding area. In general, the geometric information is generated from processing the image data depicting the surrounding area as well as sensor data generated by sensors of the mobile computing device 120. The geometric information can include position information for recognized features of the surrounding area, orientation information for the mobile computing device 120, and size information, among other examples. The orientation information, which indicates the position and/or angular orientation of the mobile computing device 120 with respect to the surrounding area is in turn based on sensor data such that received from the accelerometer 228, magnetometer 230, and gyroscope 232. Other types of sensors can also be used to generate sensor data on which the geometric information is based, including barometers, structured-light 3D scanners, and range imaging cameras, among other examples.

In one embodiment, the GUI 208 is rendered on a display 206 of the smart glasses 120-g exclusively or in addition to the touchscreen display 206 (e.g. of a smart phone), as previously described with respect to FIGS. 1B and 1C. The display 206 of the smart glasses 120-g includes an optical head-mounted display, a transparent heads-up display and/or AR overlay technology, capable of reflecting projected digital images as well as allowing the user 105 to see through the lenses. For example, the smart glasses 120-g include transparent lenses through which the user 105 directly views the networking device 110 and/or the areas of the premises 50, and the display 206 includes a projection system for projecting information onto the lenses and into a visual field of the user 105. The smart glasses 120-g also include one or more cameras 236, and the image data captured by the camera 236 corresponds with and roughly depicts the surrounding area within a natural field of view of the user 105 (e.g. the same area visible through the transparent lenses of the glasses). Portions of the GM 208 are projected onto the lenses of the glasses in different positions corresponding to visible features of the surrounding area, based on the image data captured by the camera 236. More specifically, the GUI process 216 projects the graphical elements onto the lenses of the smart glasses 120-g via the projection system of the display 206 such that the graphical elements are overlaid on the natural field of view of the user 105 in different positions based on the icon position information generated by the AR module 220. One or more sensors, including the accelerometer 228, magnetometer 230, gyroscope 232, and/or GLASS receiver 234 are incorporated into the smart glasses 120-g, for example, to detect the movement and orientation of the user 105 wearing the smart glasses 120-g.

In one example, the smart glasses 120-g incorporating the display 206 work in conjunction with a separate mobile computing device 120, as previously described with respect to FIG. 1C. For example, the sensors 228, 230, 232, 234 and camera 236 on the glasses generate the sensor data and image data, which are sent to the smartphone mobile computing device 120 to be processed by the GUI process 216, AR module 220, 3D module/image analytics module 222, and/or signal strength module executing on the CPU 202 of the smartphone mobile computing device 120. The smartphone feeds the icon position information to the smart glasses 120-g along with any other information necessary for projecting the GUI 208 onto the lenses.

In another example, the entirety of the mobile computing device 120, including the components illustrated in FIG. 2, are integrated into the smart glasses 120-g to form a single physical unit, as depicted in FIG. 1B.

Figure 3:
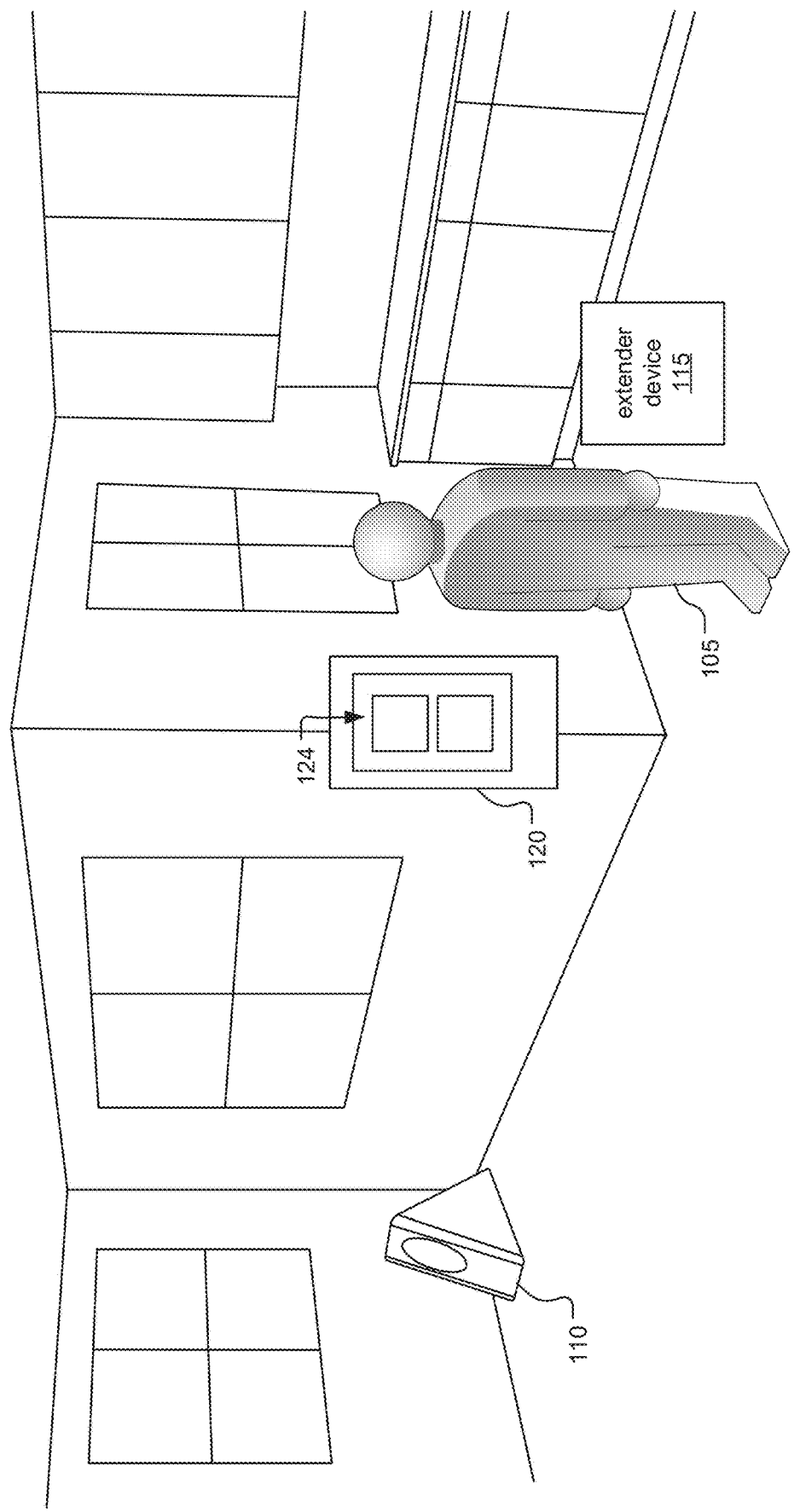
FIG. 3 is a perspective view of an exemplary premises, where a networking device is to be configured and an extender device is to be installed.

FIG. 3 is a perspective view of an exemplary premises 50, where a networking device 110 is to be configured and an extender device 115 is to be installed. In the illustrated example, the premises 50 is a home or apartment, and the user 105 is configuring the networking device 110 and installing the extender device 105. The user 105 uses the mobile computing device 120 to capture an image of the physical interface of the networking device 110. The mobile application 124 detects features of the interface and overlays configuration instructions for the user 105. To install the extender device 115, the user 105 uses the mobile computing device 120 to capture image data depicting the premises 50, including areas surrounding the networking device 110 and potential installation locations for the extender device 115. The mobile application 124 detects features of the premises, including the networking device 110, in the image data and overlays network information on the image data, including position information for the networking device 110, signal strength information, and configuration status information, which in turn facilitates the process of determining an optimal location for the extender device 115.

Figure 4:
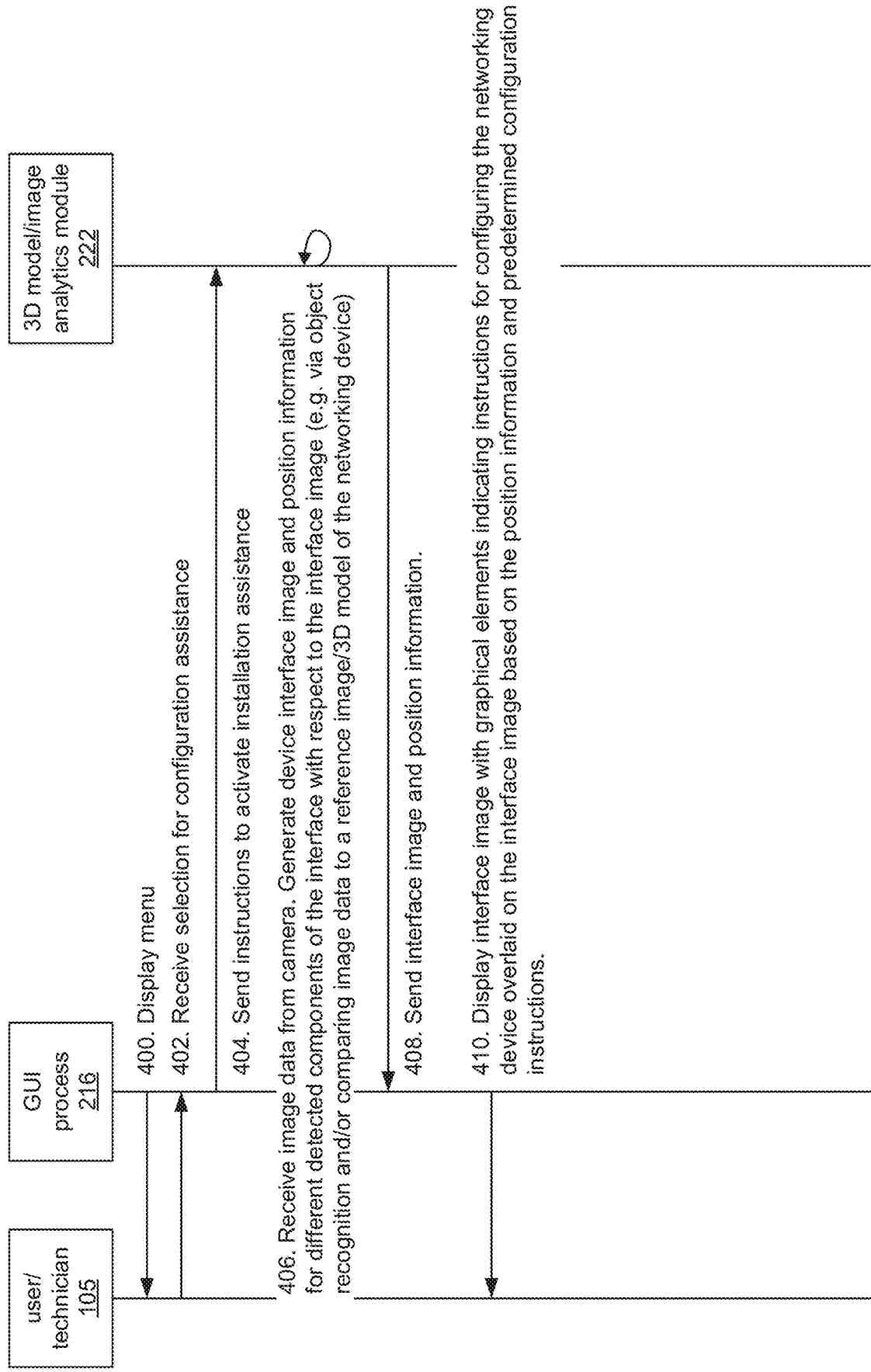
FIG. 4 is a sequence diagram illustrating a process by which the mobile application facilitates configuration of the networking device according to the current invention.

FIG. 4 is a sequence diagram illustrating the process by which the mobile application 124 facilitates configuration of the networking device 110 according to the current invention.

In step 400, the GUI process 216 displays a menu for the user 105 and receives a selection for the configuration assistance feature of the mobile application 124 in step 402 via the GUI 208 rendered on the touchscreen display 206.

In step 404, the GUI process 216 sends instructions to the 3D model/image analytics module 222 to activate.

In step 406, the 3D model/image analytics module 222 receives image data from the camera 236 and generates a device interface image, which is a still image depicting the physical network and power interface of the networking device 110. The 3D model/image analytics module 222 also generates position information for recognized features of the physical network and power interface (such as data and/or power ports) with respect to the interface image (e.g, via object recognition and/or comparing image data to a reference image and/or a model of the networking device 110).

In step 408, the 3D model/image analytics module 222 sends the interface image and the position information to the GUI process 216.

In step 410, the GUI process 216 displays the interface image with graphical elements indicating configuration instructions overlaid on the interface image based on the position information for the recognized features and predetermined configuration instructions for the networking device 110.

FIGS. 5-16 and 18-26 are illustrations of exemplary screens or views of the GUI 208. In general, the screens/views include graphical elements such as icons, virtual buttons, textual information, and menus for presenting information and/or receiving input from the user 105. Selection of the virtual buttons, for example, is indicated by the touchscreen display 206 detecting contact (for example, from the user's 105 finger) in regions of the touchscreen display 206 containing the virtual buttons. Other input is indicated by the touchscreen display 206 detecting other gestures such as dragging or swiping.

In one example, the illustrations of FIGS. 5-16 and 18-26 depict screens that are rendered on the touchscreen display 206 of the mobile computing device 120 during the installation and configuration process. In this case, in general, the screens include captured image data depicting the surrounding environment (e.g. a networking device, an area of the premises 50) in the background, and the GUI 208 includes the graphical elements overlaid on the background image data.

In another example, the illustrations of FIGS. 5-16 and 18-26 depict different views through lenses of the smart glasses 120-g. Here, the field of view of the user 105 is analogous to the background image data rendered on the touchscreen display 206 in the previous example. Instead of, or in addition to, viewing the depiction of the surrounding area rendered on the display 206, the user 105 directly views the surrounding environment through the lenses of the smart glasses 120-g, and the GUI 208 includes the graphical elements superimposed or projected into the field of view of the user 105.

Figure 5:
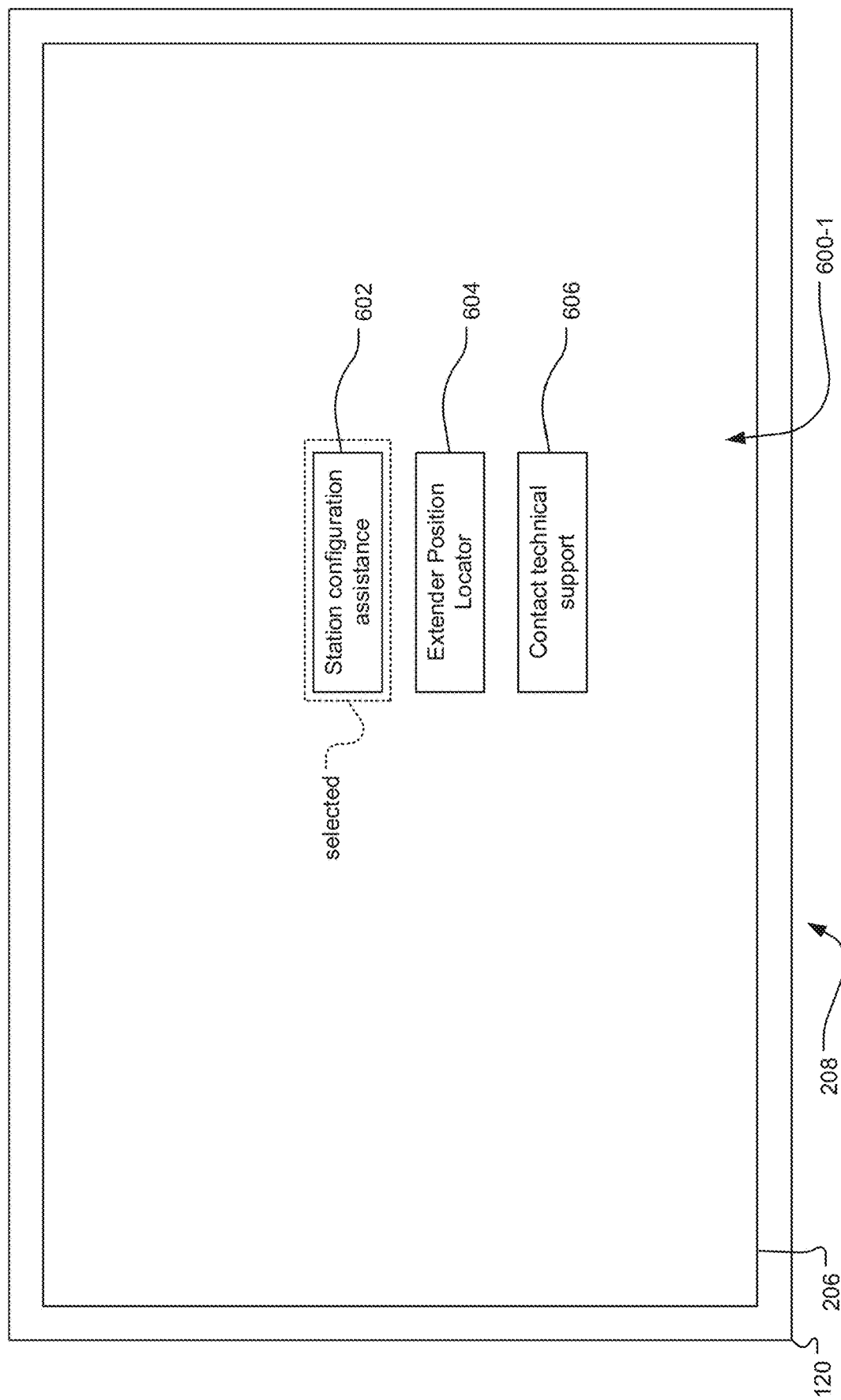
FIG. 5 is an illustration of an exemplary menu screen of a graphical user interface (GUI), which is rendered on the touchscreen display of the mobile computing device.

FIG. 5 is an illustration of an exemplary menu screen 600-1 showing the selection of the configuration assistance feature from step 402. The menu screen 600-1 includes a configuration assistance button 602, an extender position locator button 604 and a contact technical support 606 button. In the illustrated example, the configuration assistance button 602 is selected.

Figure 6:
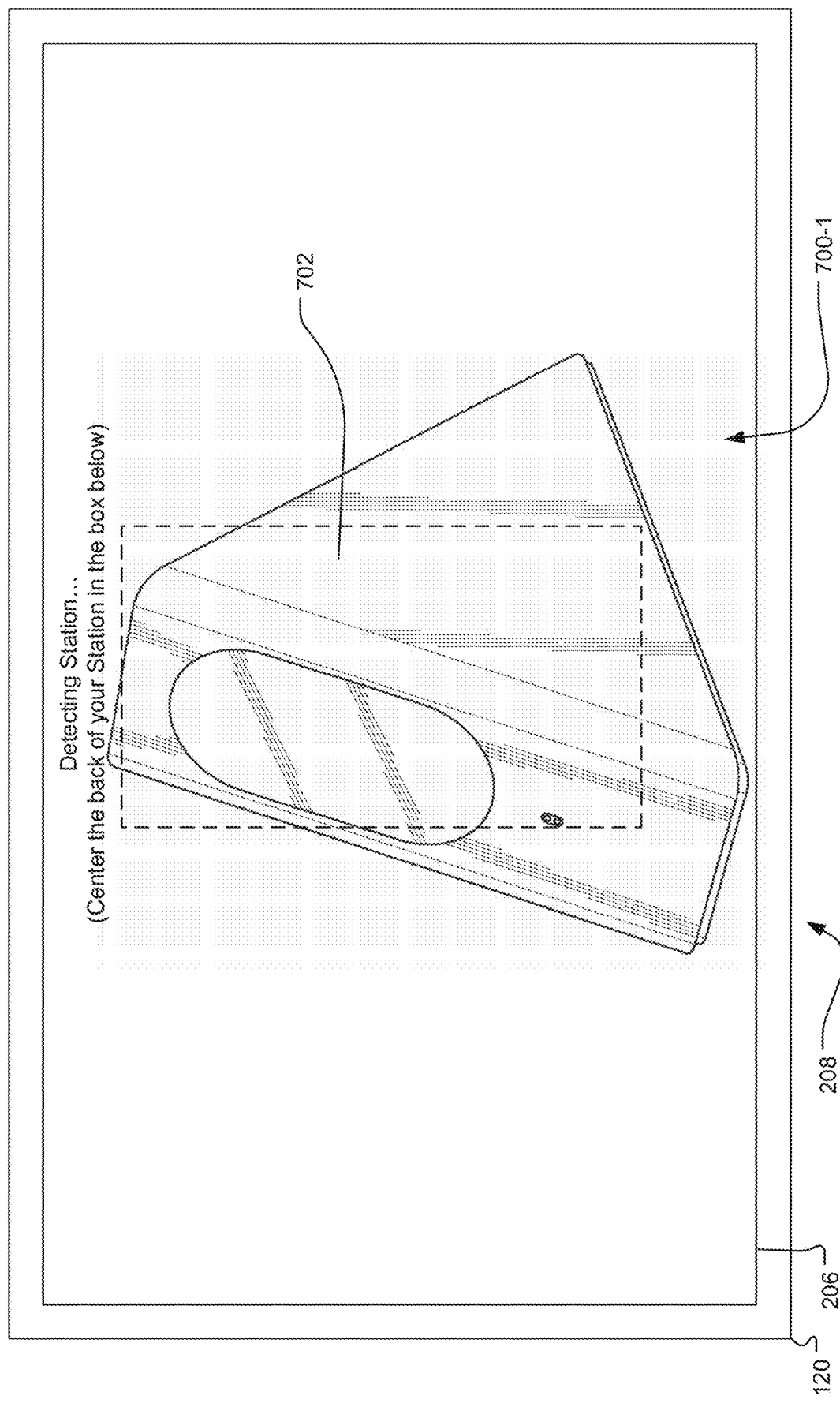
FIG. 6 is an illustration of an exemplary device recognition screen of the GUI.

FIG. 6 is an illustration of an exemplary device recognition screen 700-1, which is displayed when the configuration assistance button 602-1 is selected on the menu screen 600-1. The device recognition screen 700 includes a background the spans the entire area of the screen and includes real time captured image data depicting the area, for example, of the premises 50, that is currently in the field of vision of the camera 236. In practice, the image data would depict the networking device 110 as it does in the illustrated example, as the user 105 would be pointing the mobile computing device 120 at the networking device 110. Overlaid on the image data background is textual information indicating that the mobile application 124 is in the process of recognizing the networking device 110 as well as instructional text for the user 105 to properly orient the mobile computing device 120 and the networking device 110 with respect to each other in order to recognize, more specifically, the physical interface of the networking device 110. To this end, the device recognition screen 700 also includes a device targeting region 702, which is outlined in the illustrated example by a box with dashed lines around its perimeter. The instructional text prompts the user 105 to position the networking device 110 such that a depiction of the physical interface of the networking device 110 is contained within the device targeting region 702.

Figure 7:
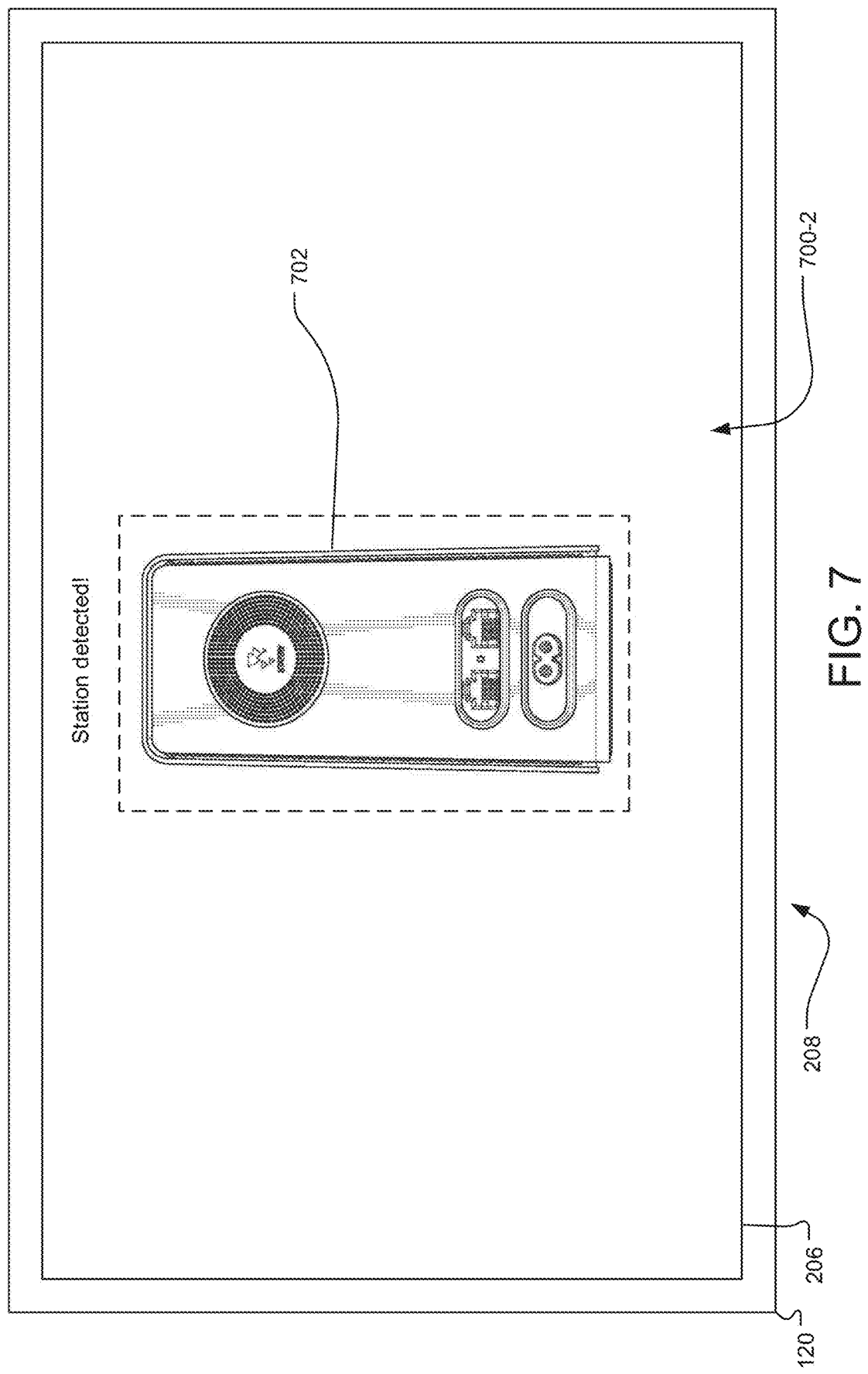
FIG. 7 is an illustration of the device recognition screen of the GUI, which is displayed after the networking device has been recognized in the image data by a 3D model/image analytics module.

FIG. 7 is an illustration of the device recognition screen 700-2 after the networking device 110 has been recognized in the image data by the 3D model/image analytics module 222. Now, the image data background depicts the physical interface of the networking device 110, and the informational text indicates that the device has been recognized.

Figure 8:
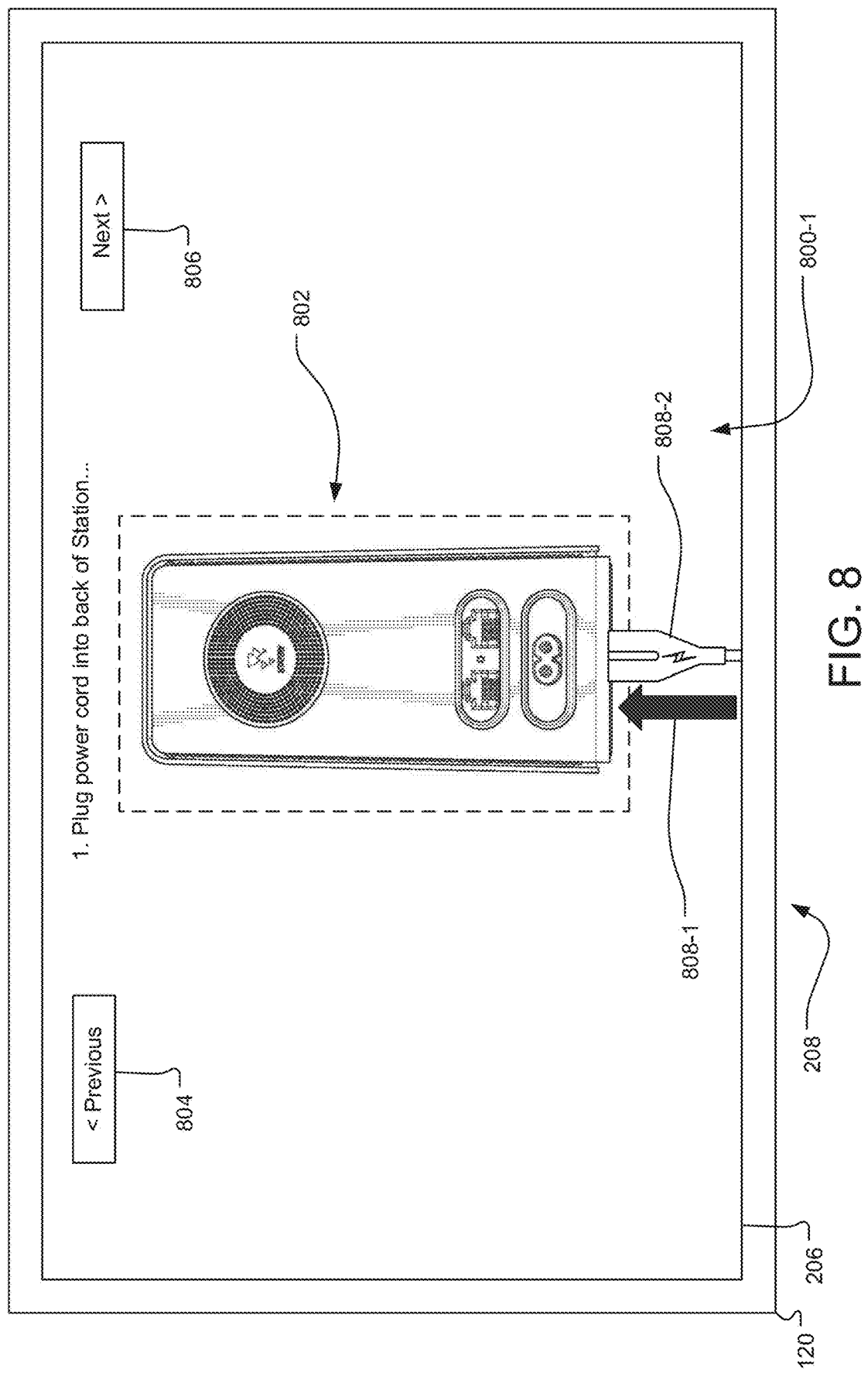
FIG. 8 is an illustration of an exemplary configuration guidance screen of the GUI.

FIG. 8 is an illustration of an exemplary configuration guidance screen 800, which is displayed after a device interface image 802 has been generated by the 3D model/image analytics module 222 in step 406. In general, the configuration guidance screen 800 displays guidance for facilitating configuration of the networking device 110 based on the networking device 110 recognized in the image data. More specifically, the configuration guidance screen 800 includes a background that spans the entire area of the screen and includes a device interface image 802, which, in the illustrated example, is a still image of the physical interface of the networking device 110 that was captured via the camera 236 of the mobile computing device 120. Overlaid on the device interface image 802 are graphical elements 808 indicating configuration guidance information in different positions with respect to the device interface image 802. The graphical elements indicate configuration guidance information by, for example, graphically depicting different steps for the user 105 to take to configure the device. These graphical elements 808 can be displayed in animation and/or can include directional arrows to more specifically guide the different steps of the configuration process.

The configuration guidance screen 800 also includes a previous button 804 and a next button 806, for navigating to previous or subsequent steps in the configuration process. Selection of these buttons 804, 806 changes the graphical elements 808 overlaid on the device interface image 802 based on which step is being depicted.

Finally, the configuration guidance screen 800 includes instructional text that generally corresponds to the step and to the actions depicted via the graphical elements 808.

In the illustrated example, configuration guidance screen 800-1 corresponds to a first step of the configuration process and includes graphical elements 808-1 and 808-2. Graphical element 808-2 is a graphical representation of a power cable for the networking device 110. Graphical element 808-1 is an arrow shape pointing in a direction to indicate the action of plugging the power cable into a power port of the physical interface. The instructional text instructs the user 105 to plug the power cable into the physical interface of the networking device 110.

Figure 9:
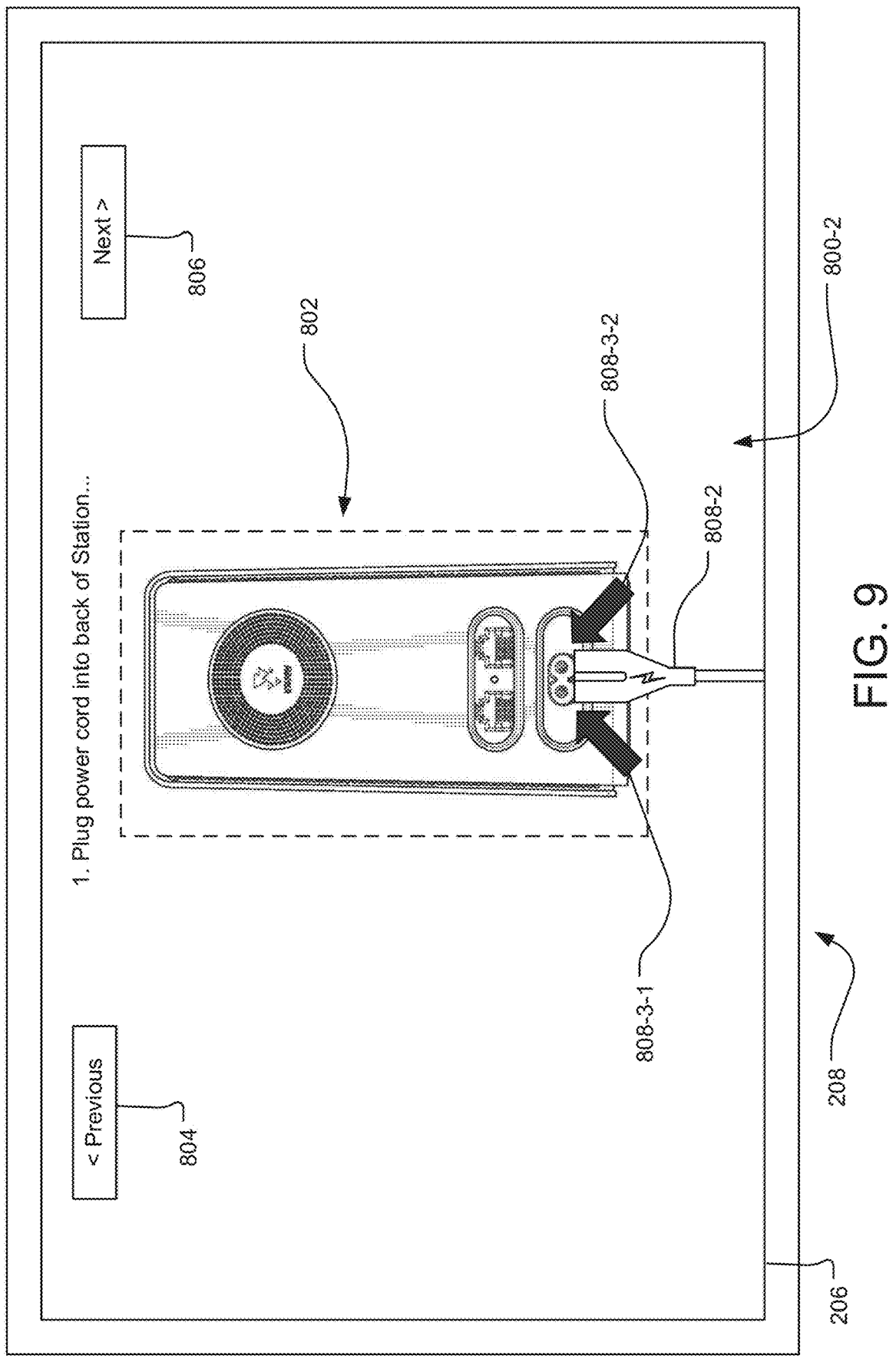
FIG. 9 is an illustration of an iteration of the configuration guidance screen displayed in an animation as a subsequent frame to the configuration guidance screen of FIG. 8.

FIG. 9 is an illustration of the configuration guidance screen 800-2, which is displayed in an animation as a subsequent frame to configuration guidance screen 800-1. In the illustrated example, configuration guidance screen 800-2 still corresponds to the first step of the configuration process and includes graphical elements 808-3-1, 808-3-2 and 808-2. As before, graphical element 808-2 represents the power cable. Now, however, the graphical element 808-2 has been positioned with respect to the device interface image 802 such that an end of the power cable aligns with an edge of the power port, and the visual characteristics of the graphical element 808-2 have been changed such that a larger portion of the power cable is depicted, simulating the action of plugging the power cable into the power port. Graphical elements 808-3-1 and 808-3-2 are arrow shapes pointing toward the power port.

Figure 10:
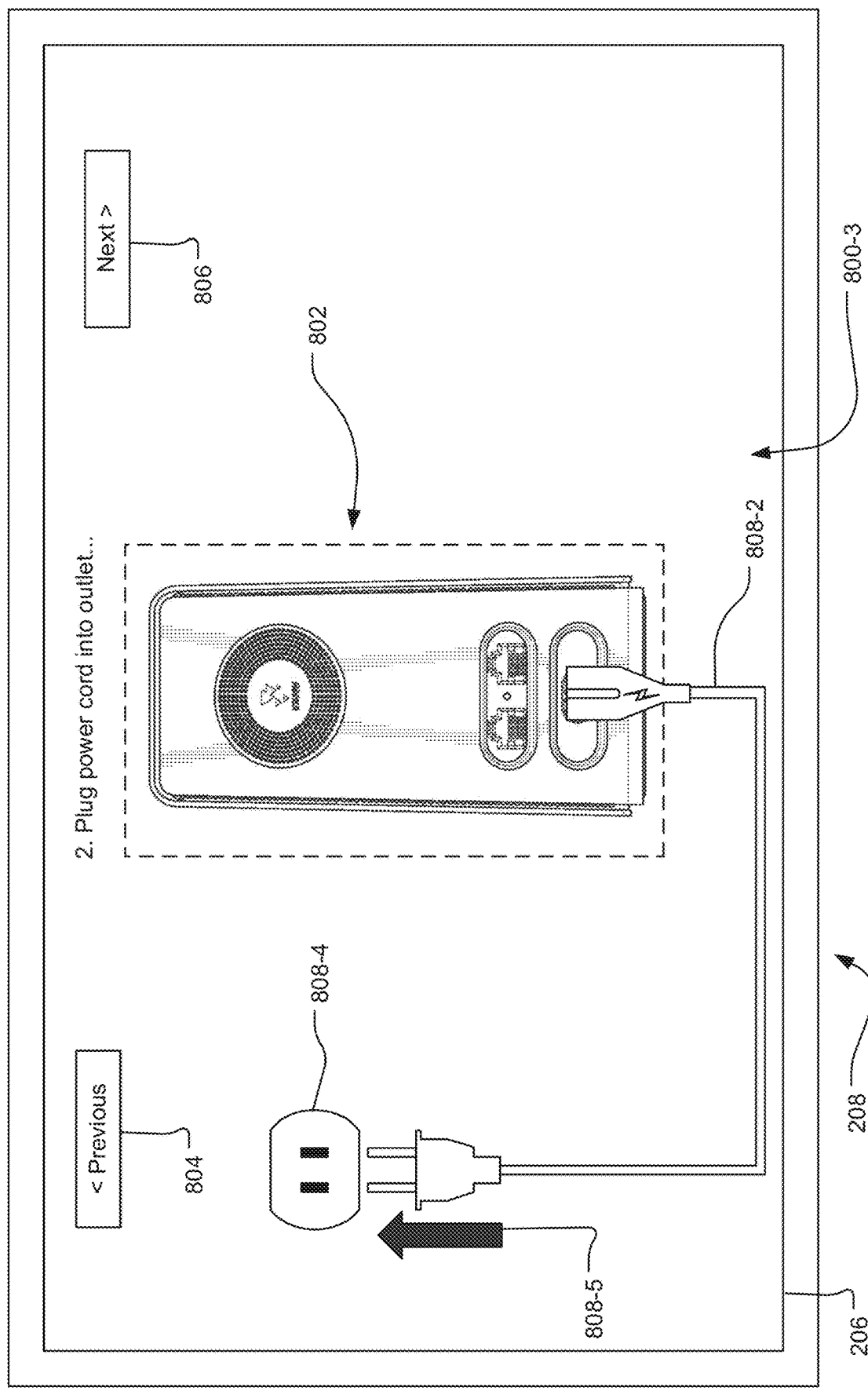
FIG. 10 is an illustration of an iteration of the configuration guidance screen displayed upon selection of a next button on the configuration guidance screen of FIG. 8 or 9.

FIG. 10 is an illustration of the configuration guidance screen 800-3, which is displayed upon selection of the next button 806 on the previous iterations of the configuration guidance screen 800-1, 800-2. In the illustrated example, configuration guidance screen 800-3 corresponds to a second step of the configuration process and includes graphical elements 808-2, 808-4 and 808-5. Graphical element 808-4 is a graphical representation of an electrical socket such as a wall socket of the premises 50. As before, graphical element 808-2 represents the power cable. Now, however, the visual characteristics of the graphical element 808-2 have been changed such that an even larger portion of the power cable is depicted, including a second end of the power cable, and the graphical element 808-2 has been positioned with respect to the device interface image 802 and graphical element 808-5 such that the first end of the power cable covers the power port depicted in the physical interface (indicating that end is plugged into the power port), and the second end of the power cable aligns with graphical element 808-4. Graphical element 808-5 is an arrow shape pointing in a direction to indicate the action of plugging the power cable into the electrical socket. The instructional text instructs the user 105 to plug the power cable into the electrical socket.

Figure 11:
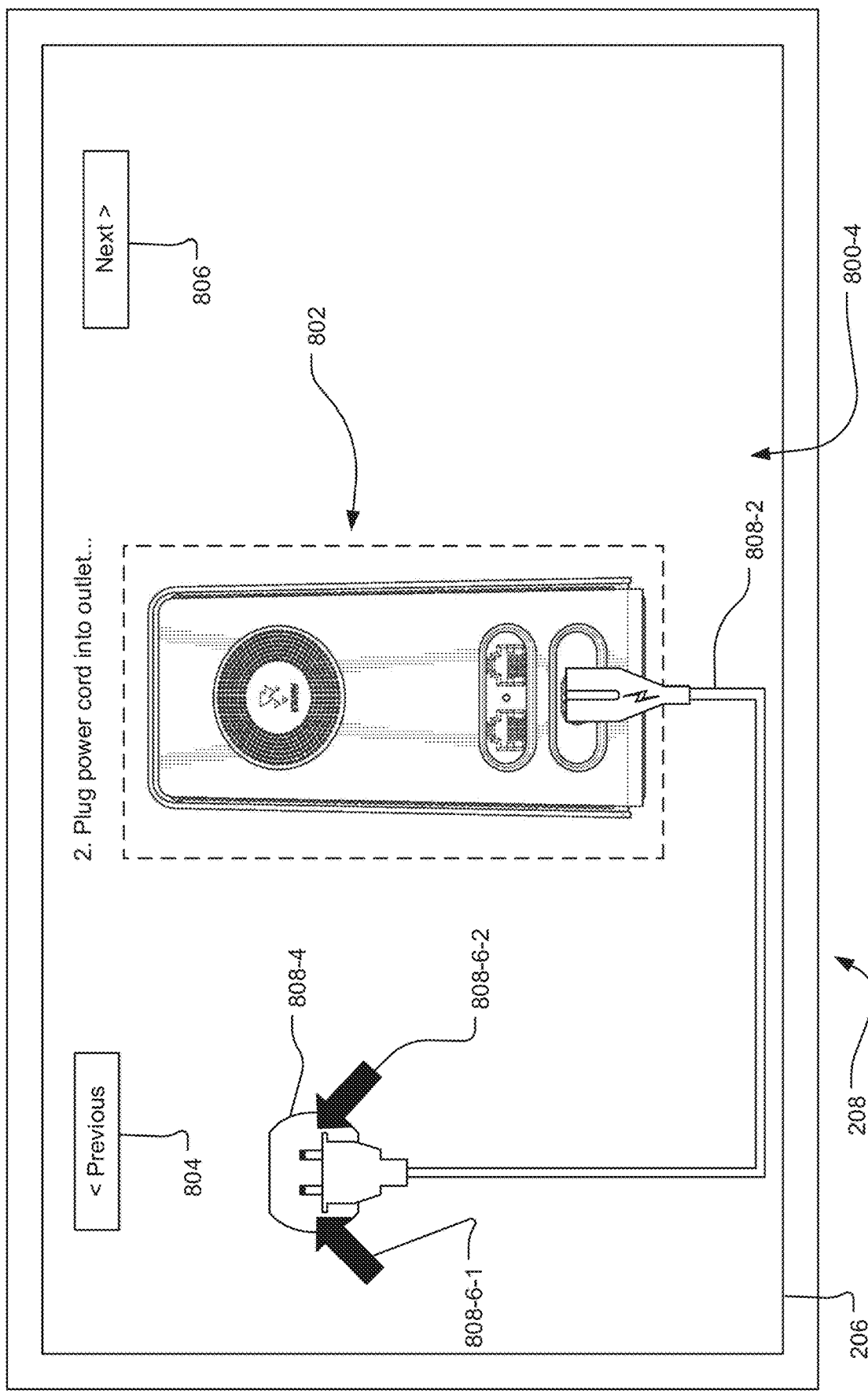
FIG. 11 is an illustration of an iteration of the configuration guidance screen displayed in an animation as a subsequent frame to the configuration guidance screen of FIG. 10.

FIG. 11 is an illustration of the configuration guidance screen 800-4, which is displayed in an animation as a subsequent frame to configuration guidance screen 800-3. In the illustrated example, configuration guidance screen 800-4 still corresponds to the second step of the configuration process and includes graphical elements 808-6-1, 808-6-2, 808-4 and 808-2. As before, graphical element 808-2 represents the power cable, and graphical element 808-4 represents the electrical socket. Now, however, graphical element 808-2 has been positioned with respect to graphical element 808-4 such that the second end of the power cable partially covers the electrical socket, and the visual characteristics of graphical element 808-2 have been changed such that a smaller portion of the second end of the power cable is depicted, suggesting that the power cable has been partially inserted into the electrical socket. Graphical elements 808-6-1 and 808-6-2 are arrow shapes pointing toward the electrical socket.

Figure 12:
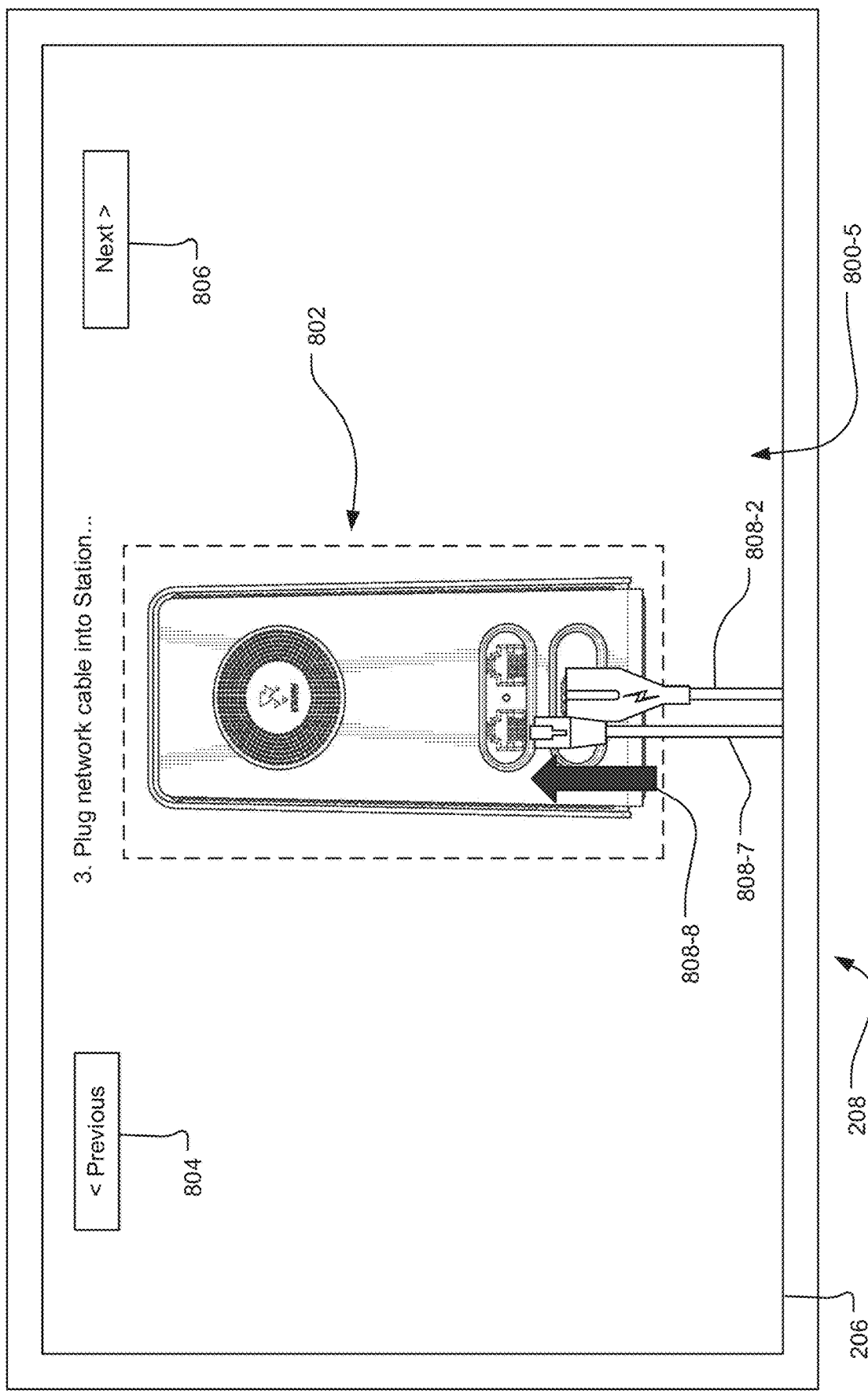
FIG. 12 is an illustration of an iteration of the configuration guidance screen displayed upon selection of a next button on the configuration guidance screens of FIG. 10 or 11.

FIG. 12 is an illustration of the configuration guidance screen 800-5, which is displayed upon selection of the next button 806 on the previous iterations of the configuration guidance screen 800-3, 800-4. In the illustrated example, configuration guidance screen 800-5 corresponds to a third step of the configuration process and includes graphical elements 808-2, 808-7 and 808-8. As before, graphical element 808-2 represents the power cable. Graphical element 808-4 is a graphical representation of an electrical socket such as a wall socket of the premises 50. Now, however, the visual characteristics of the graphical element 808-2 have been changed such that the second end of the power cable is no longer depicted. Graphical element 808-7 is a graphical representation of a network cable. Graphical element 808-8 is an arrow shape pointing in a direction to indicate the action of plugging the network cable into a network port of the physical interface. The instructional text instructs the user 105 to plug the network cable into the physical interface of the networking device 110.

Figure 13:
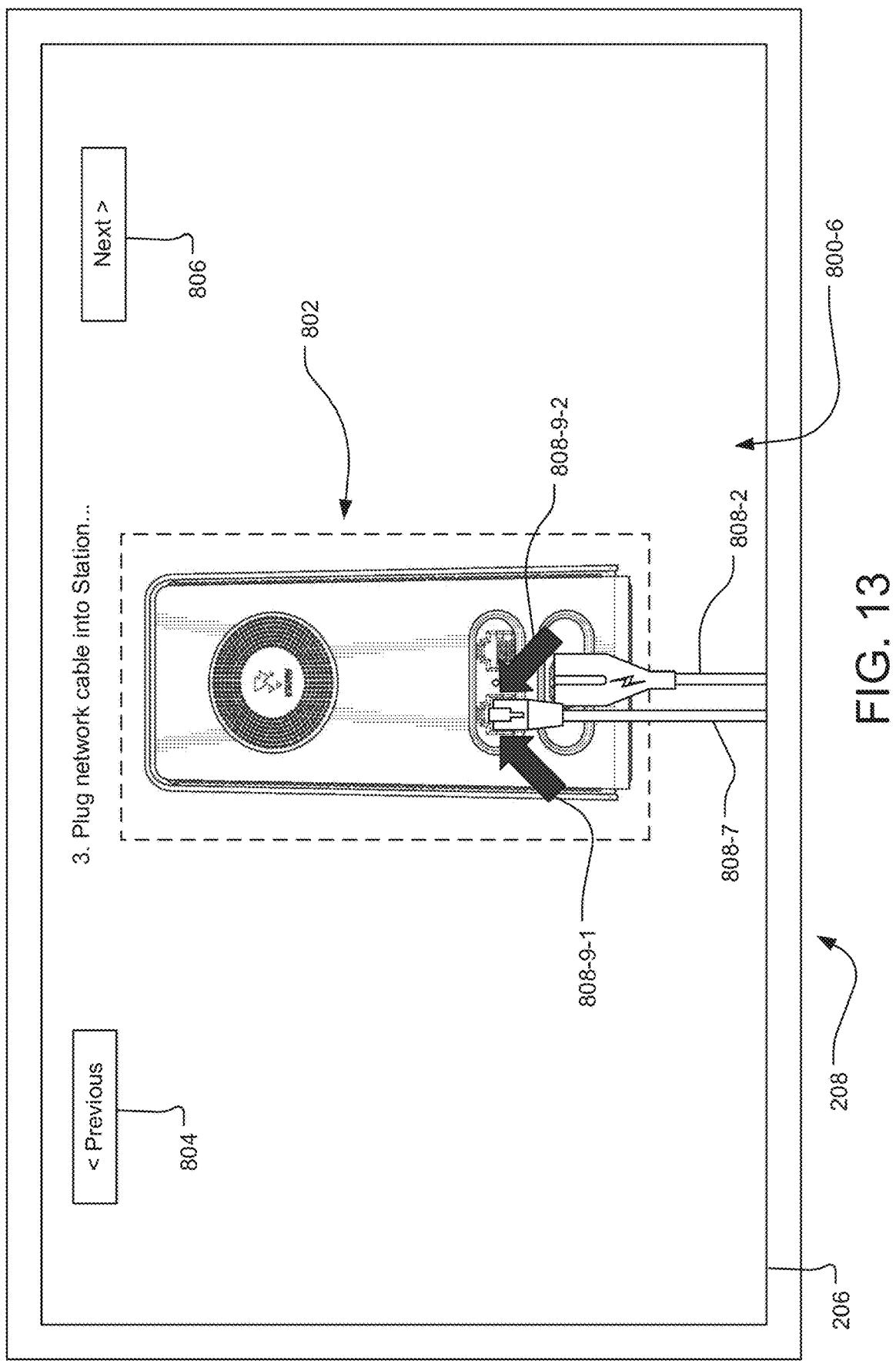
FIG. 13 is an illustration of an iteration of the configuration guidance screen displayed in an animation as a subsequent frame to the configuration guidance screen of FIG. 12.

FIG. 13 is an illustration of the configuration guidance screen 800-6, which is displayed in an animation as a subsequent frame to configuration guidance screen 800-5. In the illustrated example, configuration guidance screen 800-6 still corresponds to the third step of the configuration process and includes graphical elements 808-2, 808-7, 808-9-1, and 808-9-2. As before, graphical element 808-7 represents the network cable. Now, however, the graphical element 808-7 has been positioned with respect to the device interface image 802 such that an end of the network cable aligns with an edge of the network port, and the visual characteristics of the graphical element 808-7 have been changed such that a larger portion of the network cable is depicted, simulating the action of plugging the network cable into the network port. Graphical elements 808-9-1 and 808-9-2 are arrow shapes pointing toward the network port.

Figure 14:
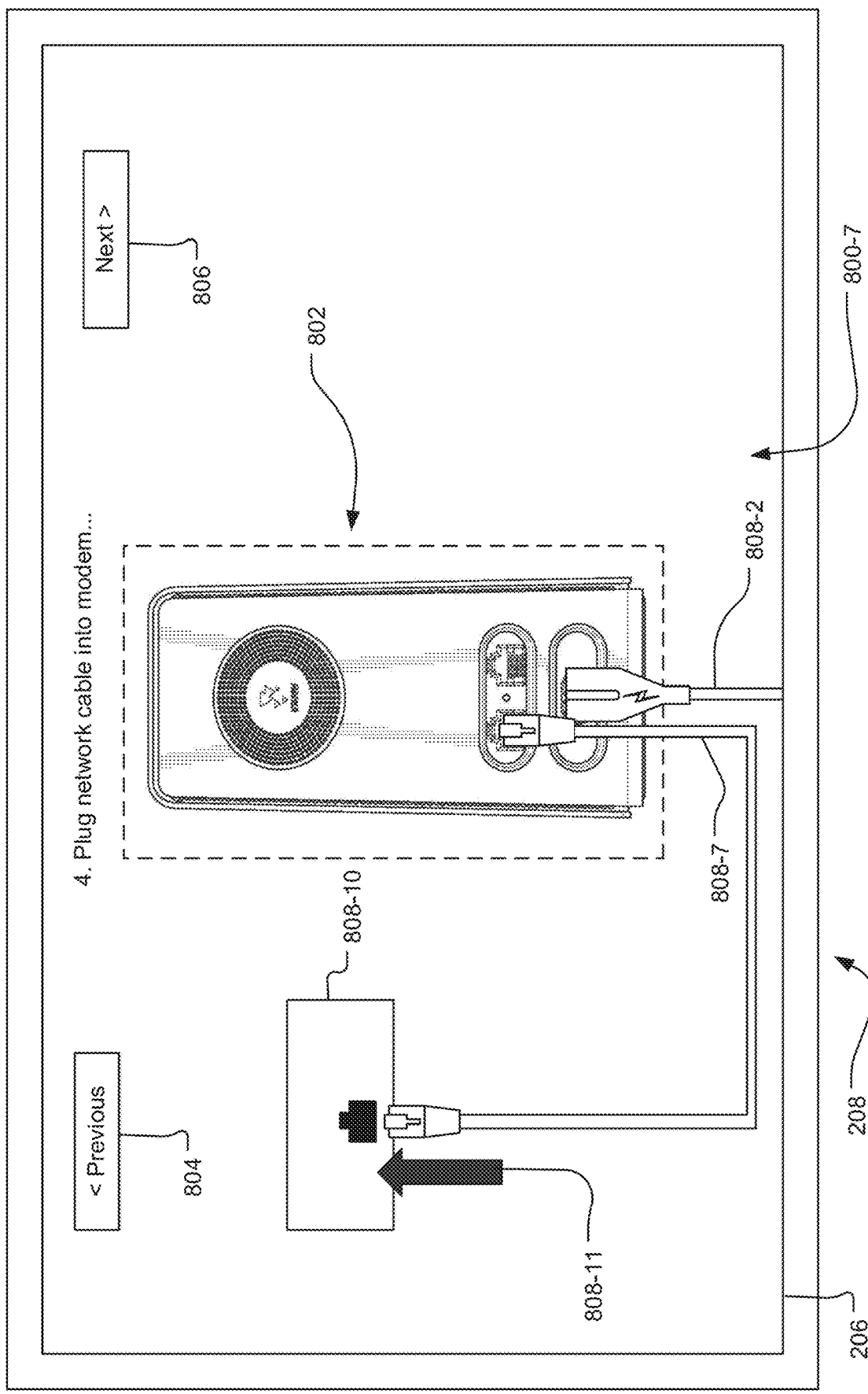
FIG. 14 is an illustration of an iteration of the configuration guidance screen displayed upon selection of a next button on the configuration guidance screen of FIG. 12 or 13.

FIG. 14 is an illustration of the configuration guidance screen 800-7, which is displayed upon selection of the next button 806 on the previous iterations of the configuration guidance screen 800-5, 800-6. In the illustrated example, configuration guidance screen 800-7 corresponds to a fourth step of the configuration process and includes graphical elements 808-2, 808-7, 808-10 and 808-11. Graphical element 808-10 is a graphical representation of a modem for connecting to the internet such as a cable modem, the graphical representation including a depiction of a network port of the modem. As before, graphical element 808-7 represents the network cable. Now, however, the visual characteristics of the graphical element 808-7 have been changed such that an even larger portion of the network cable is depicted, including a second end of the network cable, and the graphical element 808-7 has been positioned with respect to the device interface image 802 and graphical element 808-10 such that the first end of the network cable covers the network port depicted in the physical interface (Indicating that end is plugged into the network port), and the second end of the network cable aligns with the network port depicted in graphical element 808-10. Graphical element 808-11 is an arrow shape pointing in a direction to indicate the action of plugging the network cable into the network port of the modem. The instructional text instructs the user 105 to plug the network cable into the modem.

Figure 15:
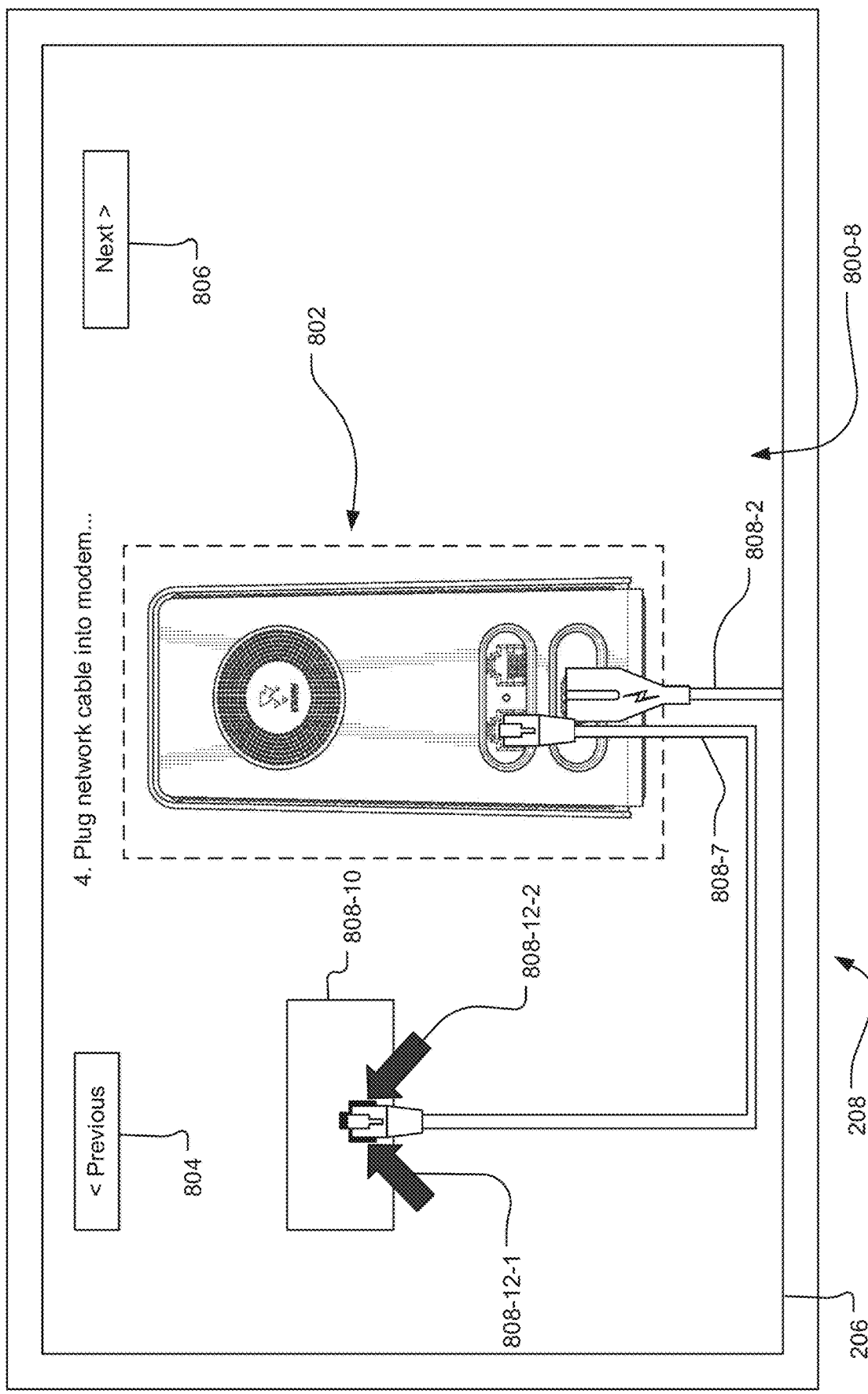
FIG. 15 is an illustration of an iteration of the configuration guidance screen displayed in an animation as a subsequent frame to the configuration guidance screen of FIG. 14.

FIG. 15 is an illustration of the configuration guidance screen 800-8, which is displayed in an animation as a subsequent frame to configuration guidance screen 800-7. In the illustrated example, configuration guidance screen 800-8 still corresponds to the fourth step of the configuration process and includes graphical elements 808-2, 808-7, 808-10, 808-12-1, and 808-12-2. As before, graphical element 808-7 represents the network cable, and graphical element 808-10 represents the modem. Now, however, graphical element 808-7 has been positioned with respect to graphical element 808-10 such that the second end of the network cable partially covers the network port of the modem, suggesting that the network cable has been inserted into the network port of the modem. Graphical elements 808-12-1 and 808-12-2 are arrow shapes pointing toward the network port of the modem.

Figure 16:
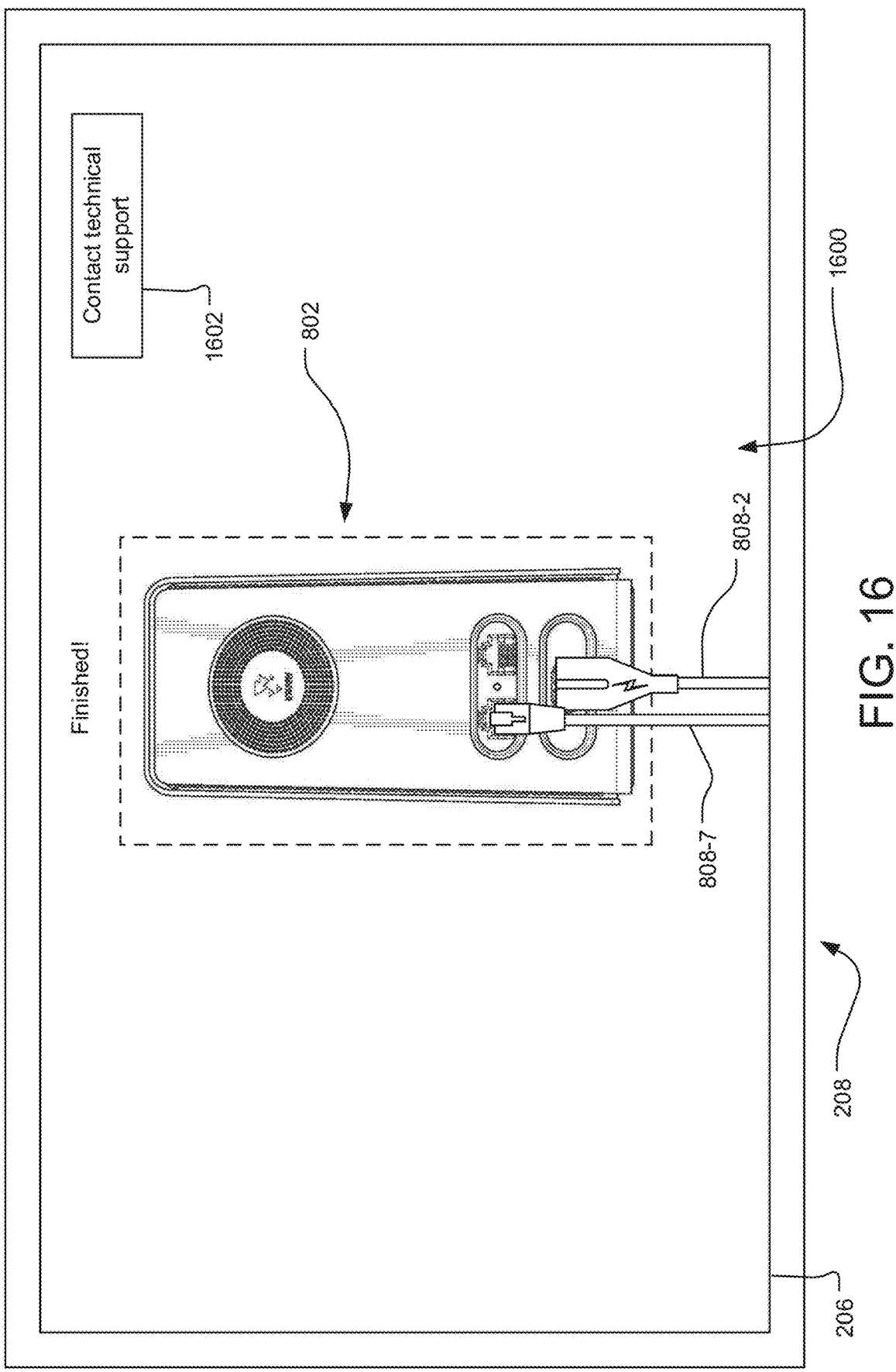
FIG. 16 is an illustration of an exemplary configuration finished screen of the GUI.

FIG. 16 is an illustration of an exemplary configuration finished screen 1600, which is displayed upon selection of the next button 806 on the configuration guidance screen 800-7, 800-8. In general, the configuration finished screen 1600 displays confirmation that the configuration tutorial has concluded. Like the configuration guidance screen 800, the configuration finished screen 1600 includes a background that spans the entire area of the screen and includes the device interface image 802 as well as graphical elements 808-2 and 808-7 representing the network cable and power cable. The configuration finished screen 1600 also includes a support button 1602 and informational text indicating that the configuration process is finished.

Figure 17:
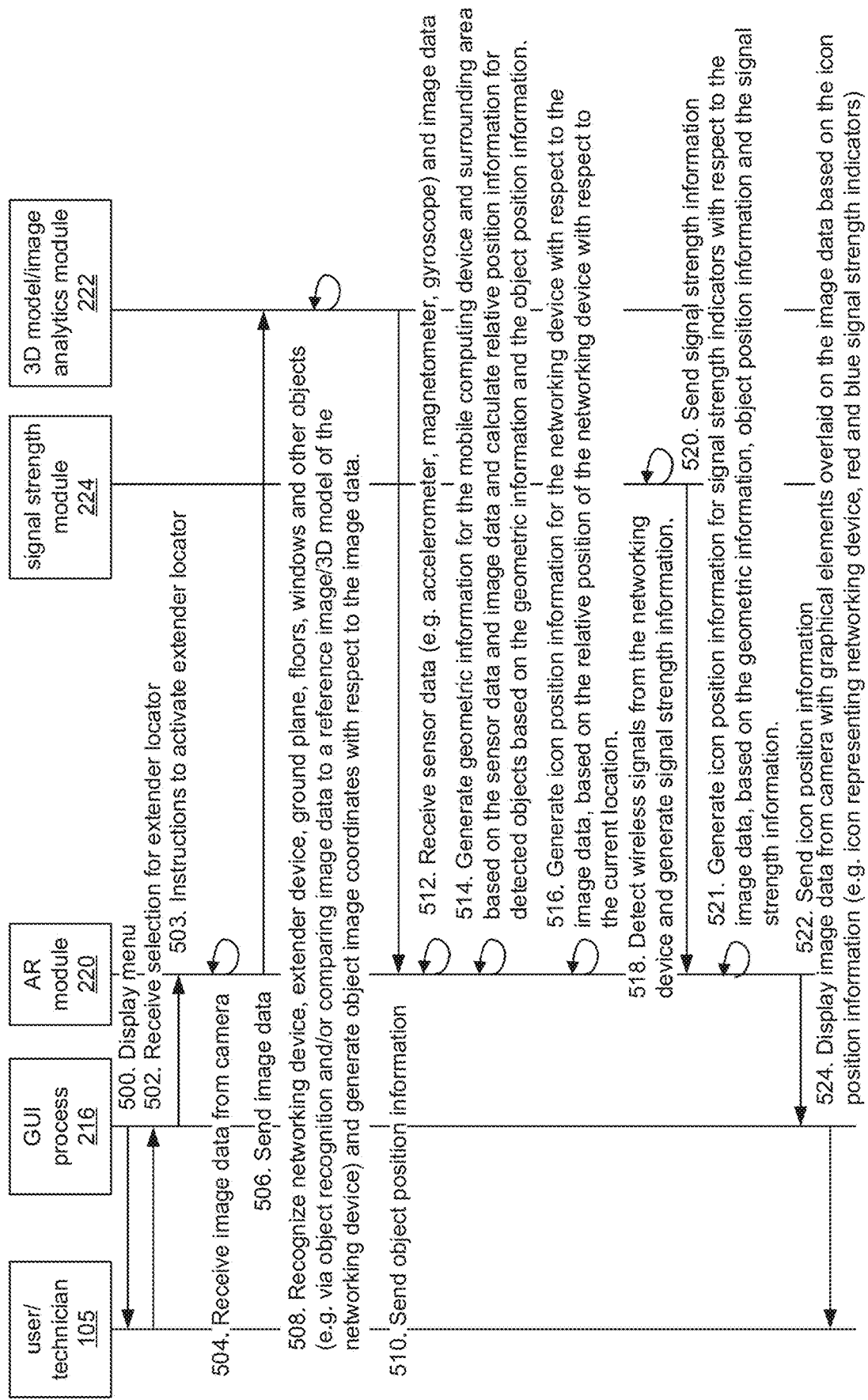
FIG. 17 is a sequence diagram illustrating a process by which the mobile application facilitates the installation of the extender device according to the current invention.

FIG. 17 is a sequence diagram illustrating the process by which the mobile application 124 facilitates the installation of the extender device 115 according to the current invention.

In step 500, the GUI process 216 displays a menu for the user 105 and receives a selection for the extender locater feature of the mobile application 124 in step 502 via the GUI 208 rendered on the touchscreen display 206 of the mobile computing device 120.

In step 503, the GUI process 216 sends instructions to the AR module 220 activate the extender locater feature.

In step 504, the AR module 220 receives image data captured via the camera 236 and sends it to the 3D model/image analytics module 222 in step 506.

In step 508, the 3D model/image analytics module 222 recognizes features of the image data, including objects depicted in the image data, such as the networking device 110, the extender device 115, a ground plane for the area depicted in the image, floors, windows and/or other objects (e.g. via object recognition and/or comparing image data to a reference image and/or a model of the networking device 110).

In step 510, the 3D model/image analytics module 222 sends position information for the recognized features of or objects depicted in the image data.

In step 512, the AR module 220 receives sensor data from the various sensors of the mobile computing device 120 such as the accelerometer 228, magnetometer 230, and gyroscope 232, and image data from the camera. Based on the sensor data and image data, the AR module 220 generates geometric information for the mobile computing device 120 and surrounding area and calculates relative position information for the recognized objects based on the geometric information and the position information for the recognized features and objects. In step 516, the AR module 220 then generates icon position information for the networking device 110 (such as coordinates) with respect to the image data, based on the relative position information for the networking device 110.

In step 518, the signal strength module 224 detects wireless signals from the networking device 110 and generates signal strength information for the signals. The signal strength module 224 then sends the signal strength information to the AR module 220 in step 520.

In step 521, the AR module 220 generates icon position information for signal strength indicators based on the position information (for example, for recognized floors depicted in the image data) and the signal strength information as well as the geometric information for the mobile computing device 120 and the surrounding area. The signal strength indicators are graphical elements indicating the signal strength for different areas of the premises 50 depicted in different regions of the image data.

In step 522, the AR module 220 sends all of the generated icon position information (for both the graphical elements representing objects such as the networking device 110 and the signal strength indicators).

Finally, in step 524, the GUI process 216 displays the image data with graphical elements overlaid on the image data based on the icon position information, including, for example, icons representing the networking device 110 and/or red or blue signal strength indicators.

Figure 18:
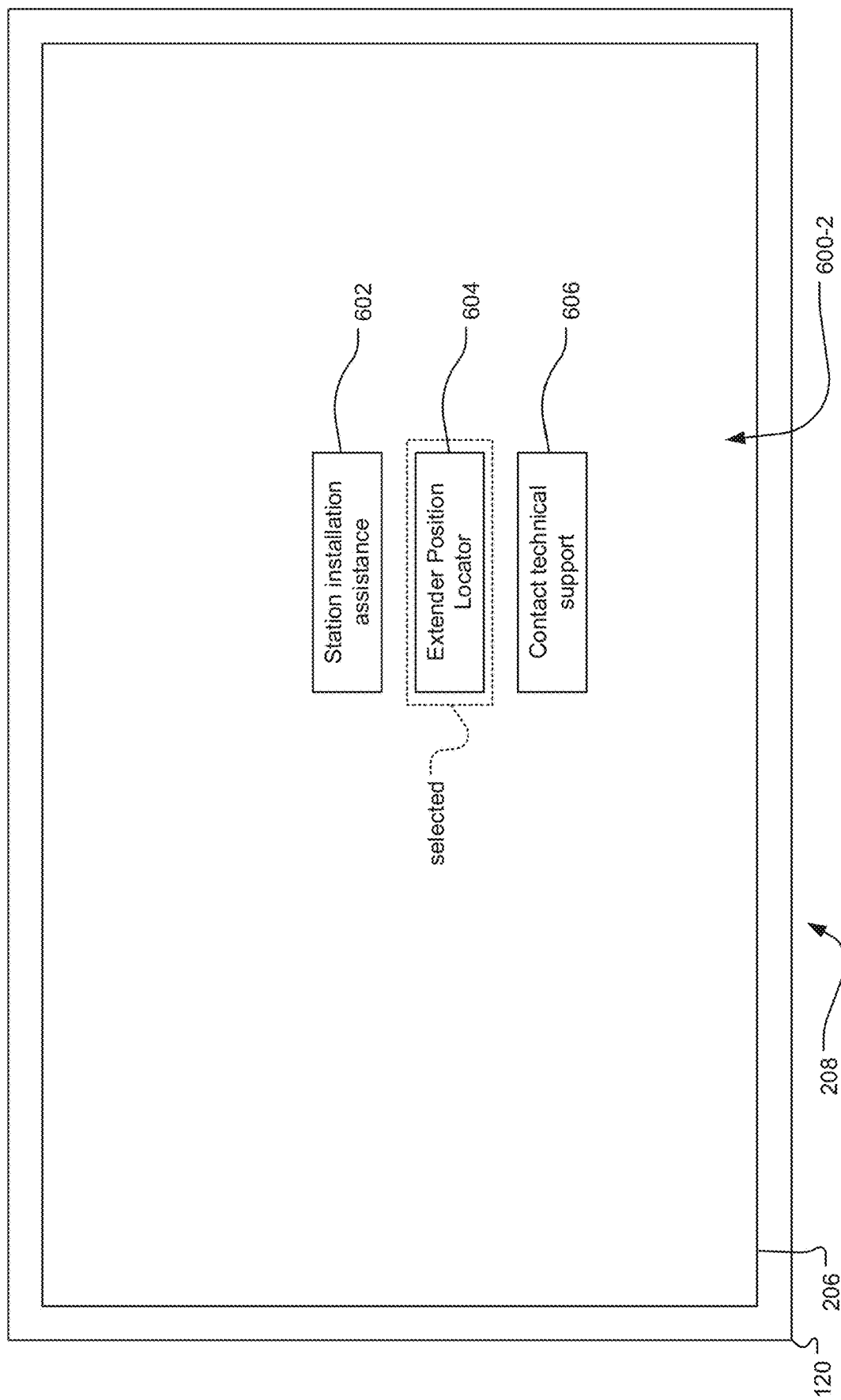
FIG. 18 is an illustration of the menu screen showing the selection of the extender locater feature.

FIG. 18 is an illustration of the menu screen 600-2 showing the selection of the extender locater feature from step 502. As before, the menu screen 600-2 includes the configuration assistance button 602, the extender position locator button 604 and the contact technical support 606 button. In the illustrated example, the extender locater button 604 is selected.

Figure 19:
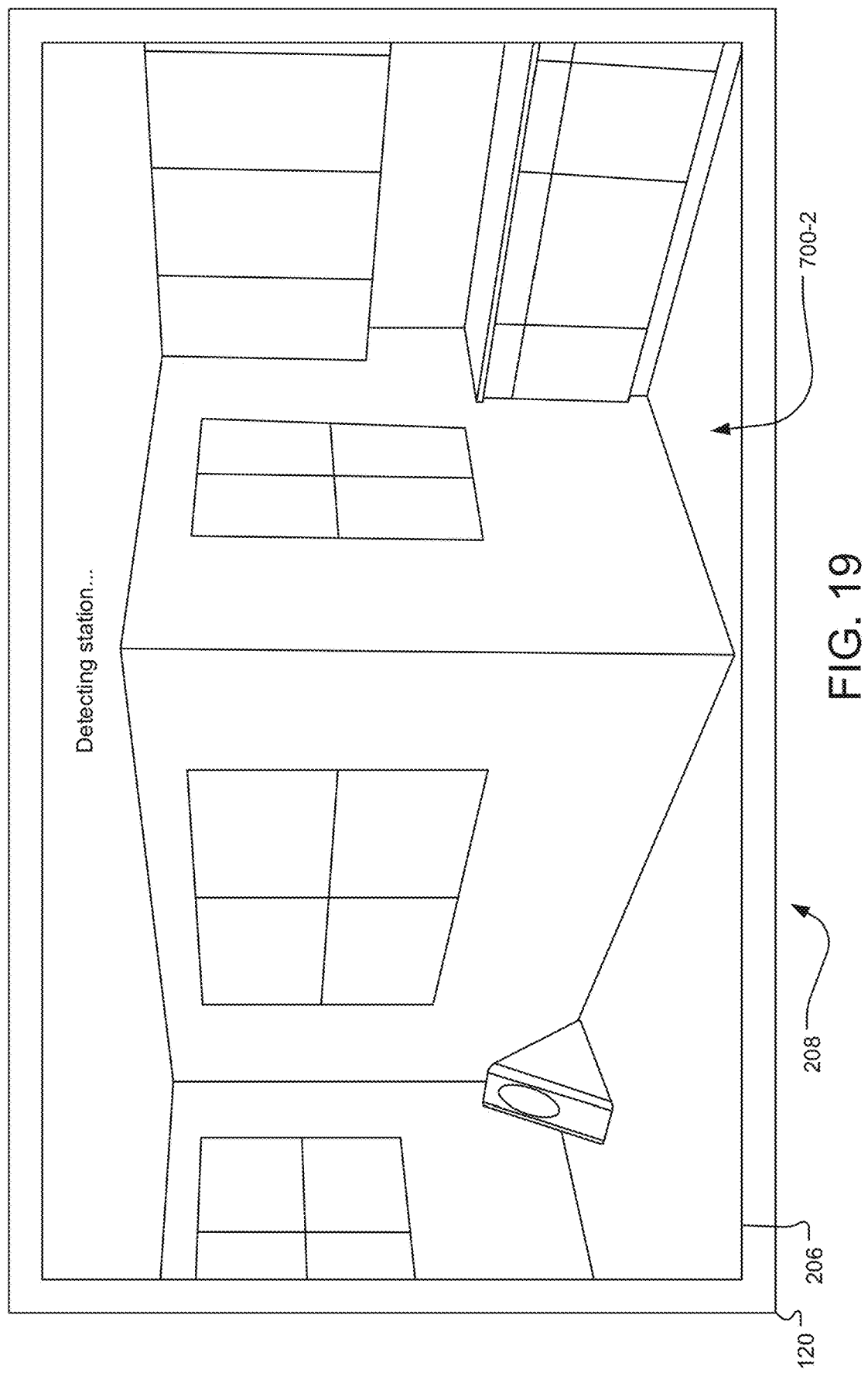
FIG. 19 is an illustration of an iteration of the device recognition screen displayed upon selection of an extender locater button on the menu screen.

FIG. 19 is an illustration of the device recognition screen 700-2, which is displayed when the extender locater button 604 is selected on the menu screen 600. Similar to the device recognition screen 700-1 for the configuration assistance feature, the device recognition screen 700-2 includes a background that spans the entire area of the screen and includes real time captured image data depicting the area, for example, of the premises 50, that is currently in the field of vision of the camera 236. In practice, the image data would depict the area surrounding the networking device 110, as the user 105 would be pointing the mobile computing device 120 at the networking device 110, potentially from a distance such that a significant portion of the premises 50 is depicted in the image data. Overlaid on the image data background is textual information indicating that the mobile application 124 is in the process of recognizing the networking device 110.

In the illustrated example, the area of the premises 50 depicted in the background image data of the device recognition screen 700-2 is a room of a house or apartment, with a networking device 110 in one corner of the room.

Figure 20:
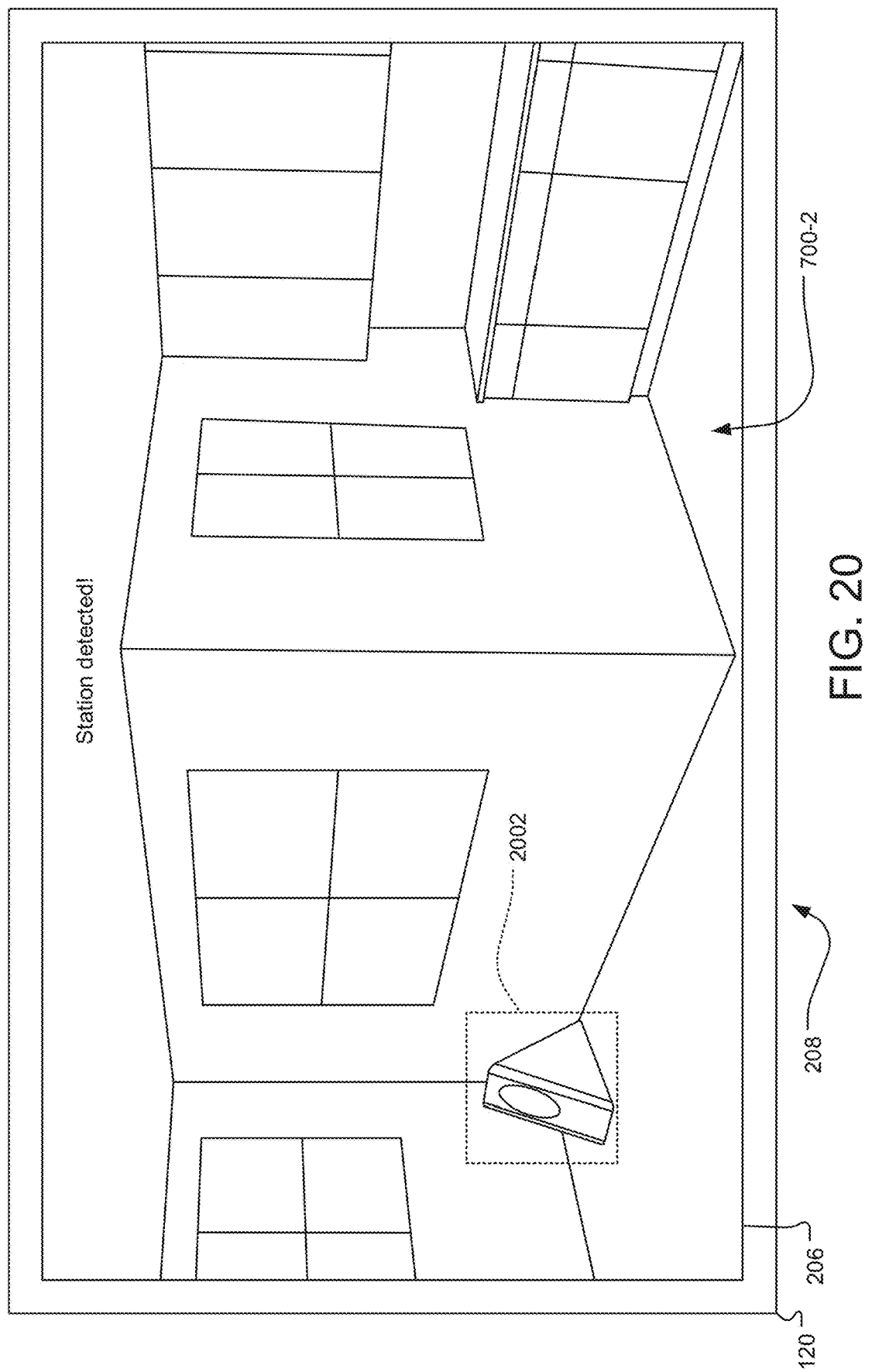
FIG. 20 is an illustration of a subsequent iteration of the device recognition screen of FIG. 19 after the networking device has been recognized in the image data by the 3D model/image analytics module.

FIG. 20 is an illustration of the device recognition screen 700-2 after the networking device 110 has been recognized in the image data by the 3D model/image analytics module 222 in step 508. Now, a networking device icon 2002 is included. The networking device icon 2002 is a graphical element representing the networking device 110. In the illustrated example, the networking device icon 2002 is a shape indicating the region of the background image data in which the networking device 110 was recognized. Informational text indicates that the device has been recognized.

Figure 21:
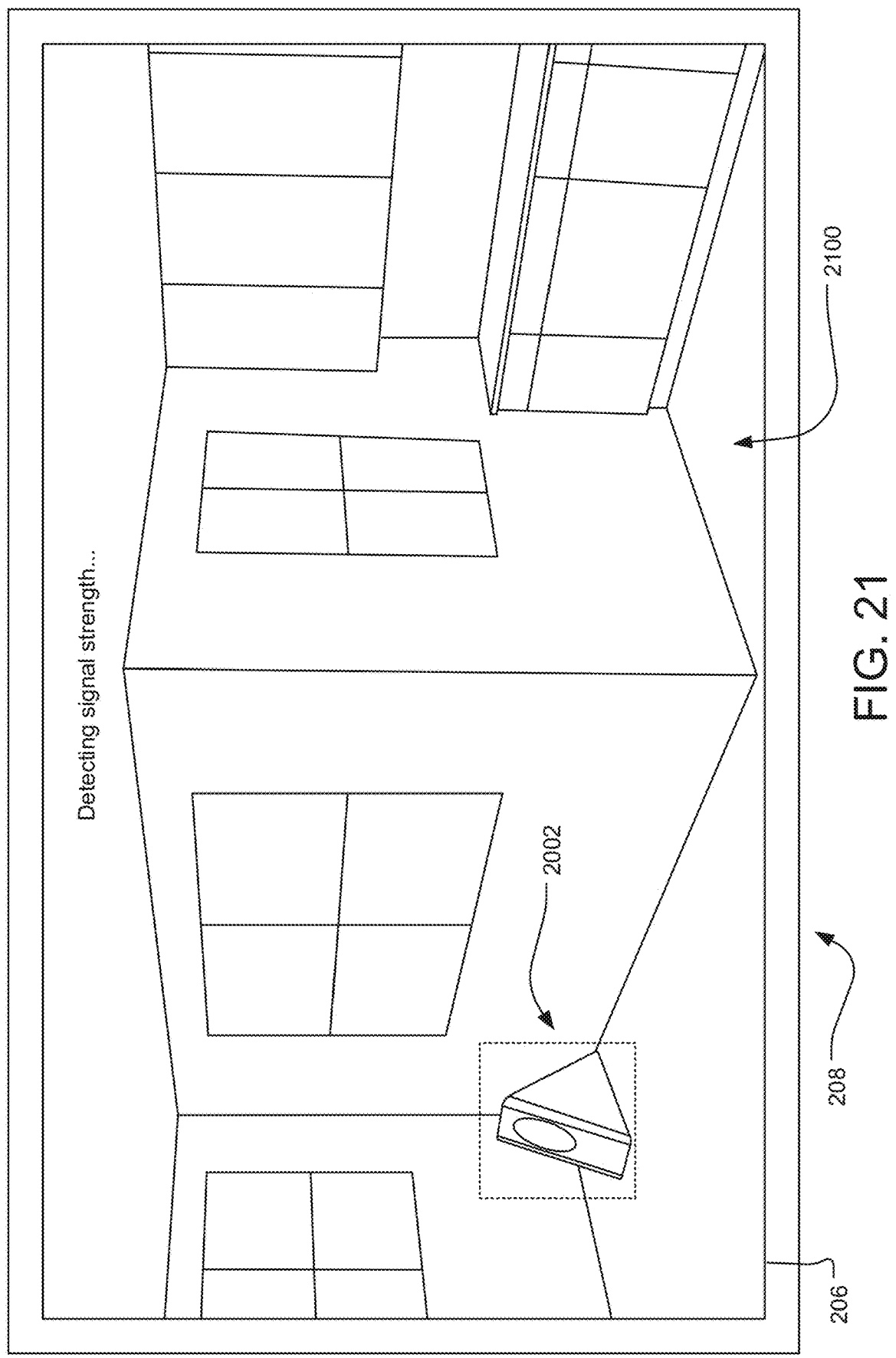
FIG. 21 is an illustration of an exemplary signal strength detection screen of the GUI.

FIG. 21 is an illustration of an exemplary signal strength detection screen 2100, which is displayed while the signal strength module 224 is generating the signal strength information in step 518. Similar to the device recognition screen 700-2, the signal strength detection screen 2100 includes a background that spans the entire area of the screen and includes real time captured image data. Overlaid on the image data background is textual information indicating that the mobile application 124 is in the process of detecting the signal strength. The signal strength detection screen 2100 also includes the graphical element 2002 indicating the region of the background image data in which the networking device 110 was recognized.

Figure 22:
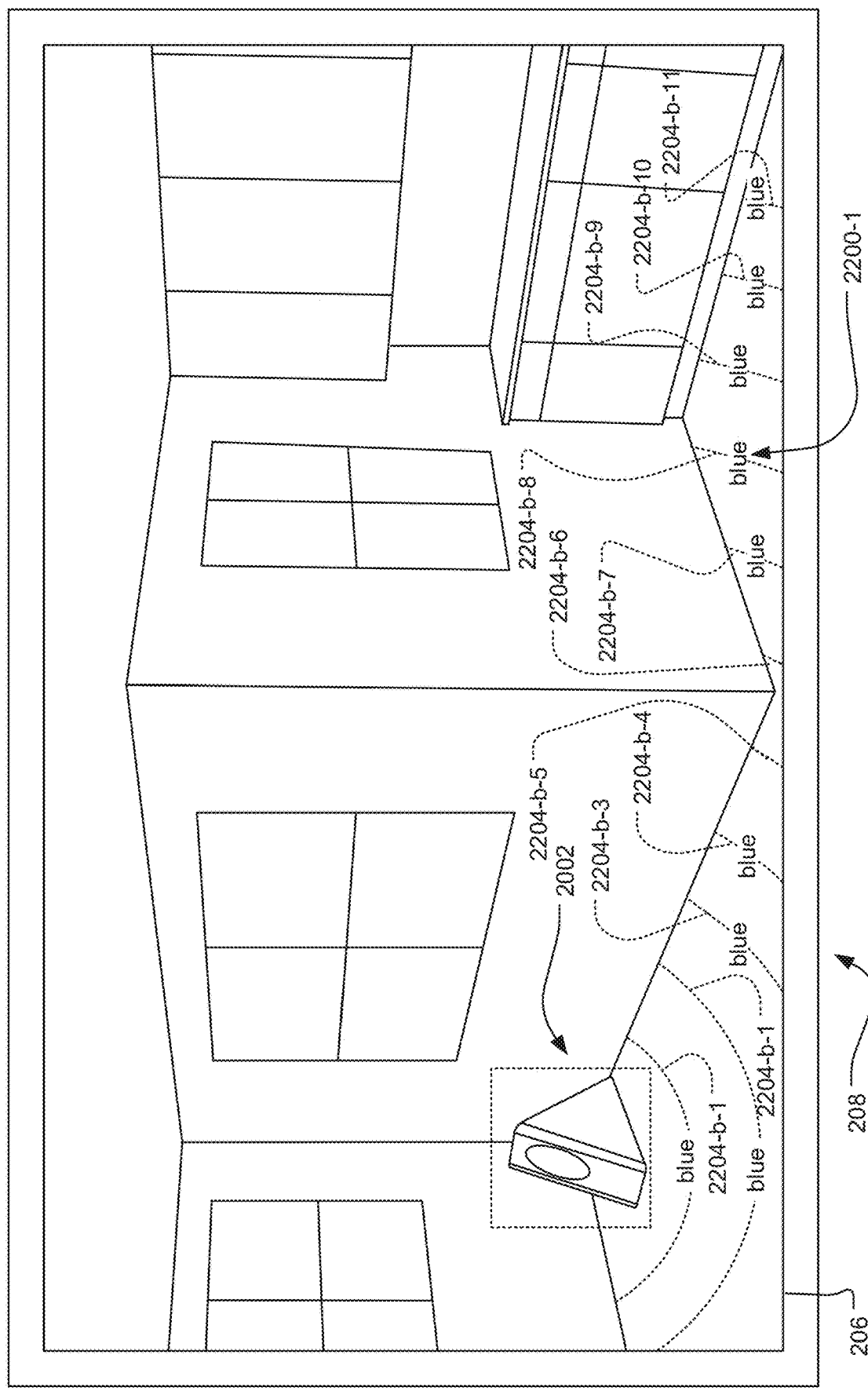
FIG. 22 is an illustration of an exemplary signal strength results screen of the GUI.

FIG. 22 is an illustration of an exemplary signal strength results screen 2200-1, which is displayed in step 524 after the signal strength information has been generated. In general, the signal strength results screen 2200 displays network information based on features and objects recognized in the image data. The signal strength results screen 2200 includes an image data background similar to the signal strength detection screen 2100. Overlaid on the image data background are signal strength indicators 2204, which are graphical elements that indicate the signal strength information. The visual characteristics and positions of the signal strength indicators with respect to the background image data are determined by the AR module 220 in step 521 and are based on the signal strength information generated in step 518 and the position information generated in step 508 for the recognized features in the image data.

More specifically, the signal strength indicators 2204 are, in theory, graphical representations of evenly-spaced, concentric ring shapes encircling the projected location of the networking device 110 (which is based on previous and/or real time recognition of the networking device 110 in the background image data). The signal strength indicators 2204 are overlaid only on the regions of the background image data containing depictions of the ground plane, or floor of the premises 50, and only the portions of the concentric rings that overlap with the depictions of the floor are visible. In practice, the signal strength indicators 2204 would commonly appear on the signal strength results screen 2200 as arcs, as walls and other recognized features of the premises 50 obscure portions of the rings.

Different colors of the signal strength indicators 2204 indicate different signal strength levels. In one example, blue signal strength indicators 2204-*b* indicate strong signals from the networking device 110, while red signal strength indicators 2204-*r* indicate weak signals from the networking device 110.

Further, in some examples different contour lines of the signal strength indicators 2204 are provided for different WiFi bands such as different indicators for each of the 2 GHz band (802.11b/g/n), 3.65 GHz band (802.11y), 5 GHz band (802.11a/h/j/n/ac/ax), 5.9 GHz band (802.11p), 60 GHz band (802.11ad/ay). This allows the user to discriminate the signal strength among the different bands.

In the illustrated example, the signal strength results screen 2200-1 includes the same image data background as in the illustrated example of the signal strength detection screen, including the depiction of a room of the premises 50 with the networking device 110 in the corner of the room. The graphical element 2002 indicating the region of the background image data in which the networking device 110 was recognized is also included. The signal strength results screen 2200-1 also includes eleven blue signal strength indicators 2204-*b*-1 through 2204-*b*-11.

Figure 23:
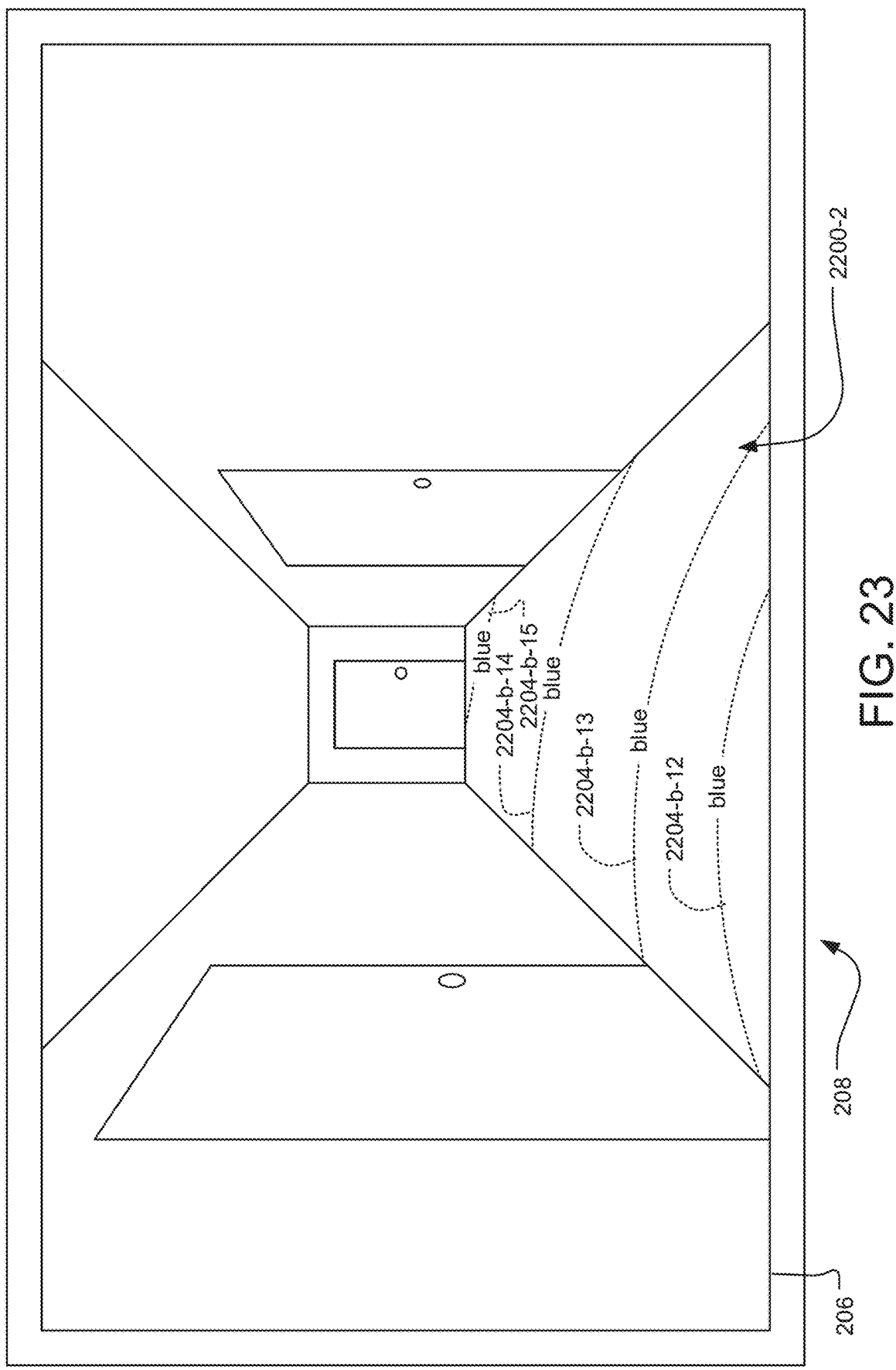
FIG. 23 is an illustration of an iteration of the signal strength results screen showing signal strength information for a second area of the premises.

FIG. 23 is an illustration of the signal strength results screen 2200-2 showing a different area of the premises 50 (for example, after mobile computing device 120 has been rotated or relocated to have a different vantage point of the premises 50). For example, the user 105 (with the mobile computing device 120) may have turned away from the networking device 110 toward a nearby hallway of the premises 50 in order to begin searching for a location to install the extender device 115. The background image data now depicts a hallway of the premises 50 with four additional blue signal strength indicators 2204-*b*-12 through 2204-*b*-15, the shape of which indicates that the networking device 110 is located at a point in the opposite direction than the direction in which the camera of the mobile computing device 120 is pointed.

Figure 24:
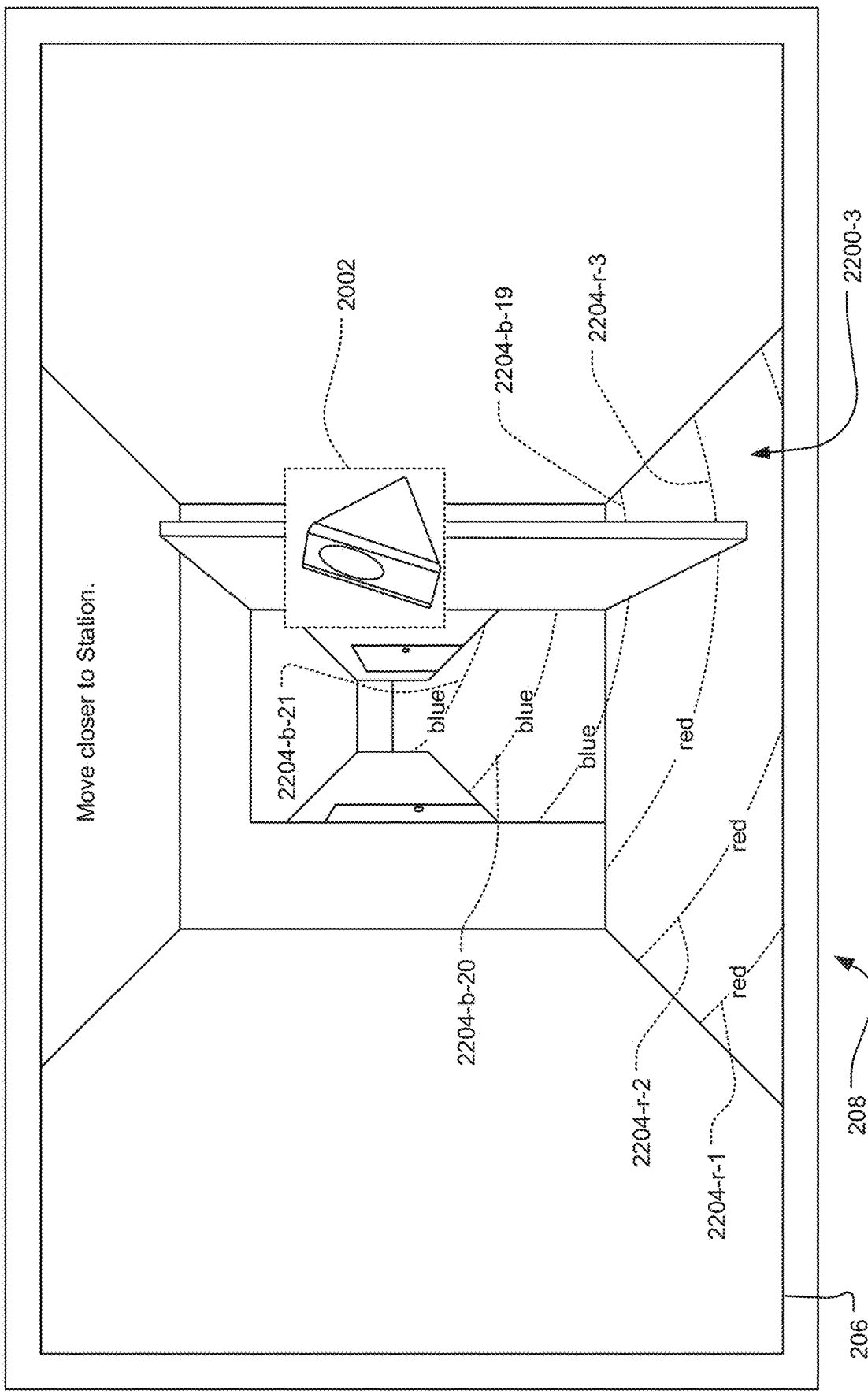
FIG. 24 is an illustration of an iteration of the signal strength results screen showing signal strength information for a third area of the premises.

FIG. 24 is an illustration of the signal strength results screen 2200-3 showing yet another area of the premises 50. In this example, the user 105 (with the mobile computing device 110) may have walked down the same hallway of the premises 50 as the one depicted in signal strength results screen 2200-2, entered a door at the end of the hallway and turned around to face the networking device 110. The background image data now depicts the hallway from a different perspective as well as a portion of a different room. Overlaid on the background image data is the networking device icon 2002, which is now a graphical representation of the networking device 110. The position of the networking device icon 2002 with respect to the image data is determined in step 516 based on the geometric information for the mobile computing device 120 and surrounding area generated in step 514 and the position information for the recognized networking device 110 generated in step 508. Also included are three additional blue signal strength indicators 2204-*b*-19 through 2204-*b*-21 and three red signal strength indicators 2204-*r*-1 through 2204-*r*-3. Consistent with the position of the networking device icon 2002, the shape of the signal strength indicators 2204 suggests that the networking device 110 is located at a point further on in the same direction as the direction in which the camera of the mobile computing device 120 is pointed (for example, in the area at the opposite end of the hallway, toward the right). Additionally, the blue signal strength indicators 2204-*b*-19 through 2204-*b*-21 are overlaid on the region of the image data depicting the floor of the hallway, whereas the red signal strength indicators 2204-*r*-1 through 2204-*r*-3, indicating a weaker signal strength, are overlaid on the region depicting a floor of a room at the end of the hallway, which would be located a further distance away from the networking device 110 than the hallway. Instructional text instructs the user 105 to move closer to the networking device 110.

Figure 25:
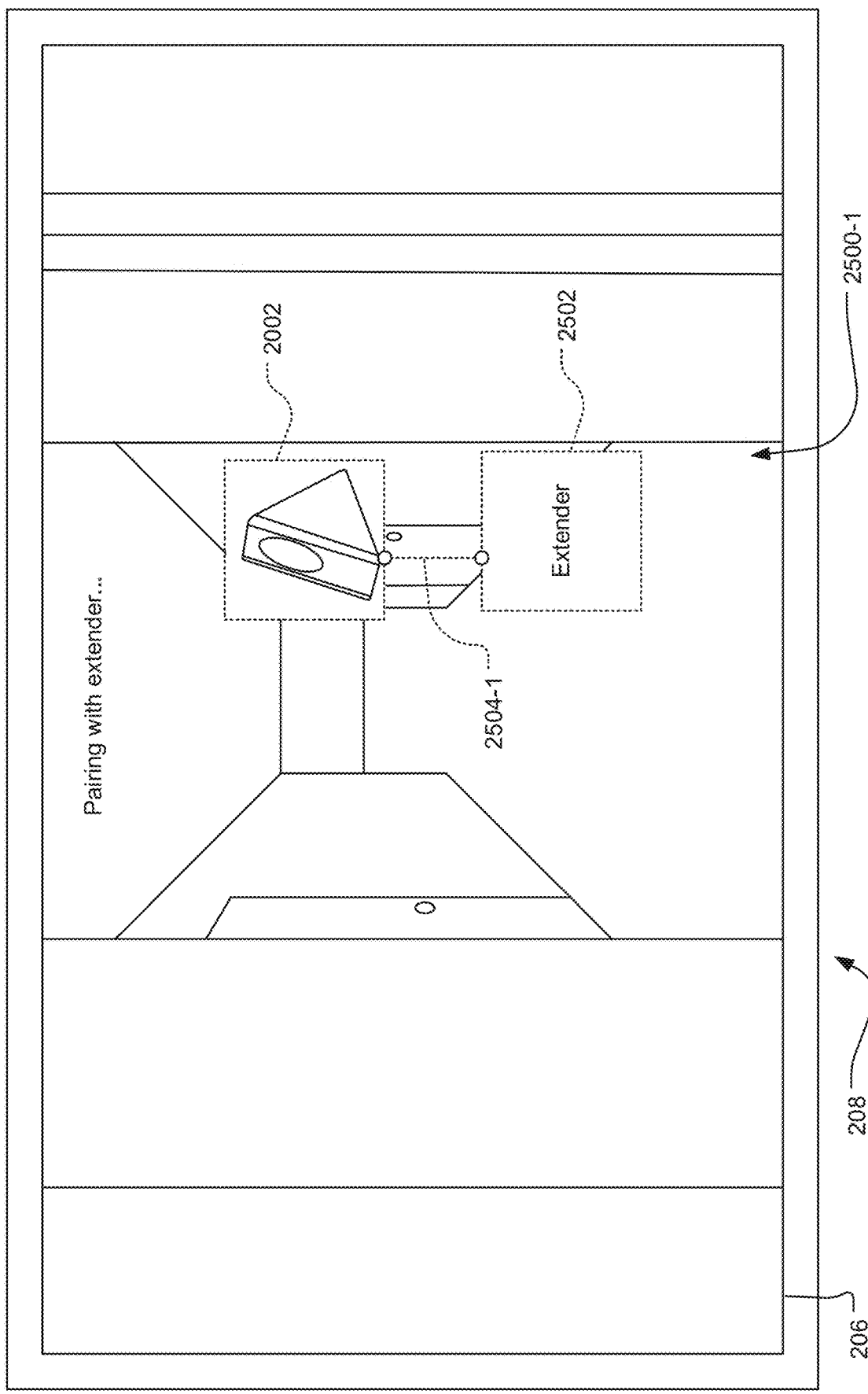
FIG. 25 is an illustration of an exemplary pairing screen of the GUI.

FIG. 25 is an illustration of an exemplary pairing screen 2500-1, which is displayed after the pairing process for the networking device 110 and the pairing device 115 is initiated. In general, the pairing screen 2500 displays configuration status information for the extender device 115. The exemplary pairing screen 2500 includes the background image data as well as the networking device icon 2002, an extender device icon 2502 representing extender device 115, and a configuration status indicator 2504-1 and informational text, both of which indicate the configuration status information.

In the illustrated example, the user 105 (with the mobile computing device 110) may have walked a few steps toward the door of the room depicted in the signal strength results screen 2200-3 to move closer to the networking device 110. The extender device icon 2502 is a shape overlaid on the background image data below the networking device icon 2002. The configuration status indicator 2504-1 is a line connecting the two device icons 2002, 2502, indicating that the pairing process is pending, which is also indicated by the informational text.

Figure 26:
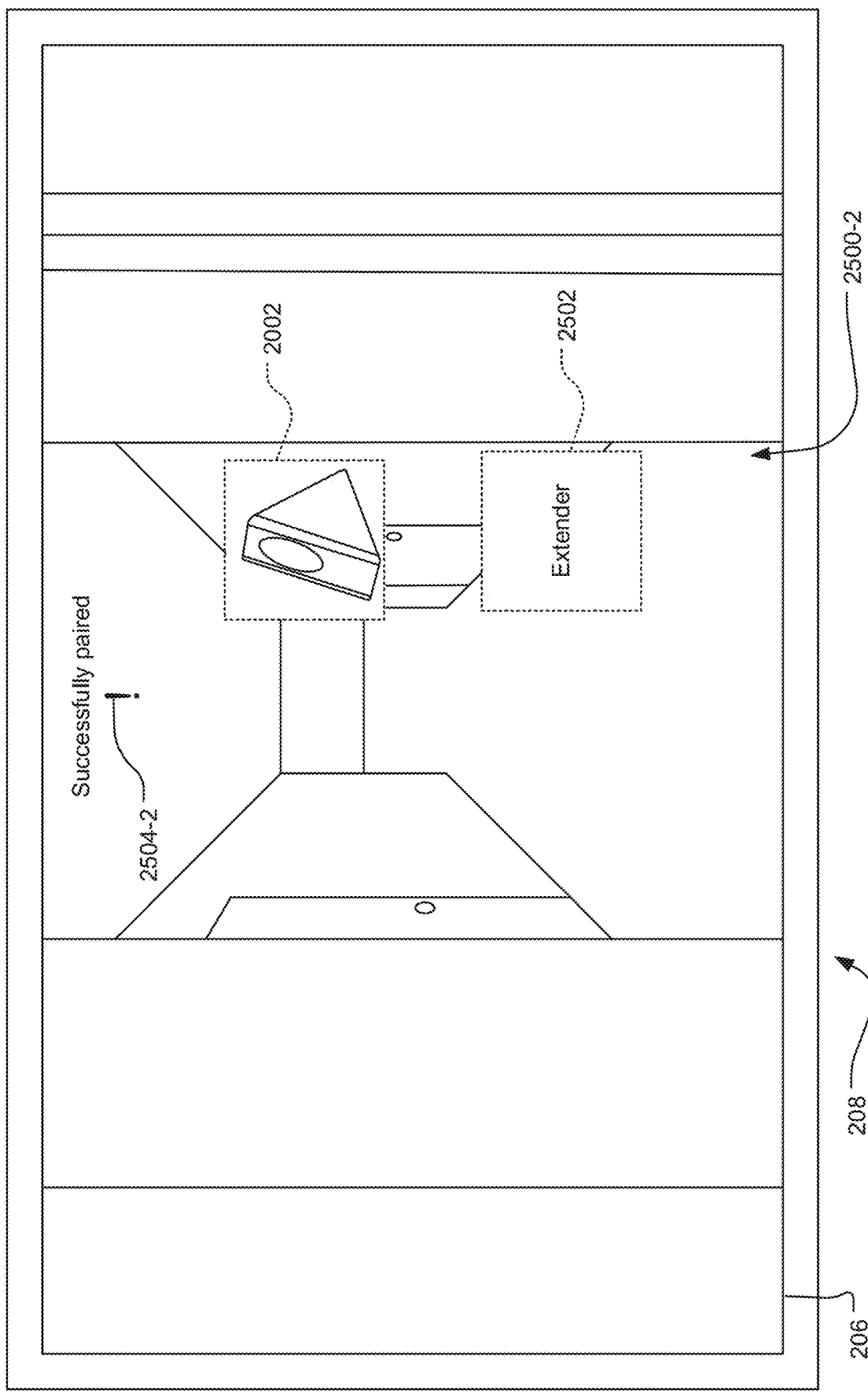
FIG. 26 is an illustration of an iteration of the pairing screen displayed after the pairing process is completed.

FIG. 26 is an illustration of the pairing screen 2500-2, which is displayed after the pairing process for the networking device 110 and the extender device 115 is completed. Here, the configuration status indicator 2504-2 is an exclamation point symbol. Both the configuration status indicator 2504-2 and the informational text both indicate that the pairing process has completed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for facilitating configuration of a networking device using a mobile computing device, the method comprising:
   capturing image data depicting the networking device;
   recognizing features of the depicted networking device based on the captured image data, the recognized features including a physical interface of the networking device; and
   displaying guidance for facilitating configuration of the networking device based on the recognized features of the networking device by overlaying a virtual diagram on top of the captured image data depicting the networking device, the virtual diagram indicating where different cables should be inserted in the physical interface of the networking device.

2. The method as claimed in claim 1, further comprising recognizing the features of the networking device by comparing the captured image data against reference images and/or models of the networking device.

3. The method as claimed in claim 1, further comprising displaying graphical elements in different positions with respect to the recognized features of the networking device, the graphical elements indicating configuration guidance information.

4. The method as claimed in claim 3, further comprising rendering the captured image data on a display of the mobile computing device with the graphical elements overlaid on the image data in different positions with respect to regions of the image data corresponding to the recognized features of the networking device.

5. The method as claimed in claim 3, further comprising superimposing the graphical elements into a field of view of a user in different positions with respect to visible features of the networking device in the field of view of the user based on the captured image data and the recognized features of the networking device.

6. The method as claimed in claim 3, further comprising displaying the graphical elements in animation.

7. The method as claimed in claim 3, further comprising the graphical elements representing cables to be plugged into an interface of the networking device, an electrical socket of a premises where the networking device is being installed, and/or ports for other devices.

8. The method as claimed in claim 1, further comprising determining a configuration status of the networking device.

9. A system for facilitating configuration of a networking device, the system comprising:
   a mobile computing device comprising a camera for capturing image data depicting the networking device, a processor for executing a mobile application for recognizing features of the depicted networking device based on the captured image data, the recognized features including a physical interface of the networking device, and a display for presenting guidance for facilitating configuration of the networking device based on the recognized features of the networking device by overlaying a virtual diagram on top of the captured image data depicting the networking device, the virtual diagram indicating where different cables should be inserted in the physical interface of the networking device.

10. The system as claimed in claim 9, wherein the mobile application recognizes the features of the networking device by comparing the captured image data against reference images and/or models of the networking device.

11. The system as claimed in claim 9, wherein the display presents graphical elements in different positions with respect to the recognized features of the networking device, the graphical elements indicating configuration guidance information.

12. The system as claimed in claim 11, wherein the mobile application renders the captured image data on the display with the graphical elements overlaid on the image data in different positions with respect to regions of the image data corresponding to the recognized features of the networking device.

13. The system as claimed in claim 11, wherein the mobile application superimposes the graphical elements into a field of view of a user via the display in different positions with respect to visible features of the networking device in the field of view of the user based on the captured image data and the recognized features of the networking device.

14. The system as claimed in claim 11, wherein the graphical elements are displayed in animation.

15. The system as claimed in claim 11, wherein the graphical elements represent cables to be plugged into an interface of the networking device, an electrical socket of a premises where the networking device is being installed, and/or ports for other devices.

16. The system as claimed in claim 11, wherein configuration status of the networking device is determined.

* * * * *